(12) United States Patent
Kato et al.

(10) Patent No.: US 8,186,774 B2
(45) Date of Patent: May 29, 2012

(54) CORE FOR RUBBER TRACK AND RUBBER TRACK

(75) Inventors: Yusaku Kato, Fukuyama (JP); Tatsuya Norito, Ibara (JP)

(73) Assignee: Fukuyama Gomu Kogyo Kabushiki Gaisha, Fukuyama (JP)

(*) Notice: Subject to any disclaimer, the term of this patent is extended or adjusted under 35 U.S.C. 154(b) by 286 days.

(21) Appl. No.: 12/451,901

(22) PCT Filed: Jun. 5, 2008

(86) PCT No.: PCT/JP2008/060331
§ 371 (c)(1),
(2), (4) Date: Dec. 4, 2009

(87) PCT Pub. No.: WO2008/149916
PCT Pub. Date: Dec. 11, 2008

(65) Prior Publication Data
US 2010/0096916 A1 Apr. 22, 2010

(30) Foreign Application Priority Data
Jun. 6, 2007 (JP) .................................. 2007/150331

(51) Int. Cl.
*B62D 55/24* (2006.01)
(52) U.S. Cl. ......... 305/174; 305/172; 305/176; 305/177
(58) Field of Classification Search .................. 305/157, 305/165, 166, 167, 169, 170, 171, 172, 173, 305/174, 176, 177
See application file for complete search history.

(56) References Cited

U.S. PATENT DOCUMENTS

| | | | | |
|---|---|---|---|---|
| 5,522,654 A | * | 6/1996 | Katoh | 305/174 |
| 5,522,655 A | * | 6/1996 | Katoh | 305/174 |
| 7,413,268 B2 | * | 8/2008 | Kato et al. | 305/172 |
| D587,728 S | * | 3/2009 | Shimozono | D15/28 |
| D588,167 S | * | 3/2009 | Shimozono | D15/28 |

(Continued)

FOREIGN PATENT DOCUMENTS

JP 3-163481 11/1989

(Continued)

*Primary Examiner* — Kip T Kotter
(74) *Attorney, Agent, or Firm* — Merek, Blackmon & Voorhees, LLC

(57) ABSTRACT

A rubber track (1) has formed in it simple means that can carry a part of abnormal tensile force acting on substantially the entire length in the circumferential direction of the rubber track (1). The construction secures smooth operation of the rubber track and reliably prevents cutting of a steel cord (s1) due to such abnormal tensile force. A core (3) has an engagement section (3b) located in the center region in the longitudinal direction of the core, guide projections (3a) on the outer sides of the guide projections (3a). The core (3) further has tensile force carrying sections (4a, 4b) arranged at positions that are located in the thickness direction of the core and are closer to the outer periphery of the rubber track than the outer peripheral-side d-surfaces of the wing sections (3c). The tensile force carrying sections (4a, 4b) carry tensile force acting in the lateral direction of the core and also carry pressing force acting in the thickness direction of the core. Corresponding tensile force carrying sections (4a, 4b) of cores adjacent to each other in the circumferential direction of the rubber track are engaged with each other. Further, a fixation belt layer in the circumferential direction of the rubber track is provided in a rubber track body (1a) at positions related to tensile force carrying sections (4a, 4b).

6 Claims, 24 Drawing Sheets

U.S. PATENT DOCUMENTS

D588,168 S * 3/2009 Shimozono .................... D15/28
2006/0279138 A1 * 12/2006 Kato et al. .................... 305/177

FOREIGN PATENT DOCUMENTS

| JP | 4-67585 | 7/1990 |
| JP | 7-137671 A | 5/1995 |
| JP | 8-216943 | 8/1996 |
| JP | 8-301154 A | 11/1996 |
| JP | 11-268672 A | 10/1999 |
| JP | 2000-313371 | 2/2000 |
| JP | 2007-22328 | 7/2005 |
| JP | 2007-050771 | 3/2007 |

* cited by examiner

Outer peripheral-side of rubber track

↑ Inner-peripheral side of rubber track

↕ Thickness direction of core

↓ Outer-peripheral side of rubber track

↑ Width direction of rubber track

↓ Circumferential direction of rubber track

⟵ - - - ⟶ Longitudinal direction of core

CORE FOR RUBBER TRACK AND RUBBER TRACK

CROSS-REFERENCE TO RELATED APPLICATION

The present application claims the priority under 35 U.S.C. 119 of Japanese Application No. 2007-150331, filed Jun. 6, 2007, which is hereby incorporated herein by reference in its entirety.

TECHNICAL FIELD

The present invention relates to a core for a rubber track and a rubber track (an endless track belt) that are used on endless track traveling devices of industrial vehicles, such as construction machines, engineering work machines, farm working machines and tracks.

TECHNICAL BACKGROUND

FIG. 12 is a side view showing a rubber track and a traveling device, and FIG. 13 is a side view showing the area around a driving wheel of the traveling device.

As shown in FIG. 12A, a conventional rubber track C comprises a rubber track body h formed from a rubber elastic body in an endless belt shape, a tensile reinforcing layer s2 and metallic cores m. The tensile reinforcing layer s2 is formed so that steel cords s1 are embedded in rows parallel to a circumferential direction in the rubber track body h. Each steel cord s1 is twisted from a plurality of steel wires acting as tensile reinforcements. The metallic cores m are embedded in the inside circumference of the tensile reinforcing layer s2 at a fixed interval in a rubber track circumferential direction as a reinforcement in the lateral direction.

A metallic core m comprises an engagement section m1 in the center region in the longitudinal direction of the core, guide projections m2 for preventing a wheel from coming off the track on both sides in the longitudinal direction of the core of the engagement section m1, and wing sections m3.

Further, there is also a core with a horizontally protruding body to prevent the track C from coming off the track traveling device (for example, see patent literature No. 1 that is identified hereinafter).

Generally, the rubber track C is used by being suspended on a coupled driving wheel (idler) A and a driving wheel (sprocket) S of an endless track traveling device M of, for example, a construction machine, etc., as shown in FIG. 12B. In the figure, T is a track frame, R1 is a lower rotary wheel, and R2 is an upper rotary wheel.

The rubber track C has a problem that the steel cords s1 of the tensile reinforcing layer s2 can be cut.

The steel cords s1 can be cut by various causes. As one of the causes, as shown in FIG. 13, the bottoms of the sprocket S clog with sand J so that the cores m rise from the bottoms between teeth of the sprocket, and an abnormal tensile force is imposed on the rubber track C.

Further, as another factor, cuts are caused by what water sinking in from cracks occurring on the rubber track, the steel cords s1 corroding, and a tensile force being imposed on the corroded portion.

To resolve the problem of the cutting of the steel cords, it has been suggested that the tensile force in the circumferential direction acting on a rubber track be equally dispersed on the whole steel cords (for example, see patent literature No. 2) and that an engagement section be provided to prevent the interval between the cores m adjoining one another in the circumferential direction in the rubber track body h from changing (for example, see patent literature No. 3).

Many rubber tracks having no steel cords (steel cordless rubber tracks) s1 have been suggested. For example, there are a connecting link type rubber track using a track link of a conventional metallic track (for example, see patent literature No. 4) and a rubber track carrying out a tensile reinforcement through members other than steel cords s1 (for example, see patent literature No. 3 or patent literature No. 5).

[Parent literature No. 1] Japanese utility model publication No. 04-067585 (especially, FIG. 6)

[Patent literature No. 2] Japanese patent publication No. 2007-022328

[Patent literature No. 3] Japanese patent publication No. 08-301154

[Patent literature No. 4] Japanese patent No. 3163481

[Patent literature No. 5] Japanese patent publication No. 2000-313371

SUMMARY OF THE INVENTION

Problems to be Solved by the Invention

The present invention is achieved by paying attention to a problem in conventional rubber tracks, namely, the problem that the tensile reinforcements (steel cords s1) are cut due to abnormal tensile force imposed on the rubber track C because the bottoms of the sprocket S clog with sand J. To solve this problem, generally, the strength per tensile reinforcement (steel cord) or the number of embedded tensile reinforcements has been increased.

However, the corrosion of the steel cords can not be solved by enhancing the strength of the steel cords or by increasing the number of embedded steel cords.

A conventional rubber track C disclosed in Patent literature No. 1 aims to prevent the rubber track C from coming off. That is, when the rubber track C reaches a condition in which a lateral slippage occurs, horizontally protruding bodies that each protrude in a direction orthogonal to a side surface of the core m embedded in the rubber track body h strike one another between the adjoining cores m. Accordingly, the track is prevented from coming off by checking the slippage.

FIGS. 14A and 14B are explanatory views showing how cores m and a steel cord s1 stand when the rubber track is used. In patent literature No. 1, as shown in FIG. 14A, a rubber track C having a hook m5 on the tip of a horizontally protruding body m4 of the core m is disclosed. A main purpose of the hook m5 is to prevent the core m from separating from the rubber track body h and to prevent losing an action for regulating the slippage caused by the collision between the horizontally protruding bodies m4 because an interval between the adjoining cores m spreads and their overlapping situation can not be kept. That is, the hook m5 is not intended to bear tensile force acting on the entire length in the circumferential direction of the rubber track, which is taken by the tensile reinforcing layer s2, on the horizontally protruding body m4.

An effect on the hook m5 in patent literature No. 1 will be explained as follows. When the rubber track C runs aground impeditive stones while traveling on a bad road, guide projections m2 of the core m clash with the track frame T. In this case, when a force F separating the core m from the rubber track body h acts (force is added in a direction where the adjoining cores m separate), the hook m5 engages with the hook m5 of the adjoining core m, and therefore, the adjoining core m also takes the force F so that the force does not concentrate on one core m.

Usually, both hooks m6 of the adjoining cores m do not need to be engaged in a contacted state, rather as shown in FIG. 6 of patent literature No. 1, they are adequately separated. Accordingly, even if the position of the tensile reinforcing layer s1 in the thickness direction of the rubber track is greatly different from the position of hook m5, the hooks m5 smoothly go around the driving wheel S and the coupled driving wheel A. Accordingly, in the rubber track C with the hook m5, the tensile reinforcing layer s2 composed of the tensile reinforcements (steel cords s1) takes the tensile force acting on the entire length in the circumferential direction of the rubber track, which is caused by sand stuffed in the bottoms of the sprocket S. It is not expected that the hook m5 takes the tensile force. Accordingly, the hook m5 can not solve the problem that the tensile reinforcements (steel cords s1) are cut by the tensile force acting on the entire length in the circumferential direction of the rubber track C.

The conventional rubber track C disclosed in patent literature No. 2 can disperse excessive tensile force acting on the steel cords s1, but unusual tensile force can not be prevented from acting on the steel cords s1. Therefore, the tensile reinforcing layer s2 is not prevented from cuts caused by the unusual tensile force.

The conventional rubber track C disclosed in patent literature No. 3 prevents the lateral slippage of the portion of the rubber track C and an extension of the interval length between the adjoining cores m by placing the tensile force acting on the entire length in the circumferential direction of the rubber track on an engagement section m6 protruding outside in the lateral direction of the core of the wing portion m3 of the core m. That is, it prevents losing an action for regulating the slippage caused by the collision between the horizontally protruding bodies because an interval between the adjoining cores m spreads and their overlapping situation can not be kept. Therefore, it is not expected that the tensile reinforcing layer s2 is prevented from cutting.

In the conventional rubber track C disclosed in patent literature No. 3, although the engaging section m6 is provided on the wing portion, it does not bear the relative displacement in the thickness (vertical) direction of the core.

For example, as shown in FIG. 14B, when the rubber track C runs on stones and is partially bended upwardly, the engagement sections m6 between the adjoining cores m easily come off in the vertical direction. In this state, when the driving force of the driving wheel S is added to the rubber track C to pull it, the engagement sections m6 separate in the circumferential direction of the rubber track to come off. Thereafter, even if the bended portion of the rubber track C becomes straight and the driving force of the driving wheel decreases or disappears, the engagement sections m6 no longer return to the original engaged state.

In this case, the engaging section m6 of the corresponding core can not carry the tensile force of the rubber track C, and therefore, the rubber of the rubber track body h is cut by the tensile force, and finally, the rubber track C will be cut.

Accordingly, in the conventional rubber track C disclosed in patent literature No. 3, the problem regarding the cutting of the tensile reinforcements (steel cords s1) caused by the above-mentioned action has not been solved yet.

Further, the above-mentioned steel cordless track has an economic problem in that the cost of parts and the cost of production are expensive in comparison with the conventional rubber track.

The present invention has been achieved to conquer the above-mentioned problems. That is, it is an object to secure smooth operation of the rubber track by forming simple means that can carry the tensile force acting on substantially the entire length in the circumferential direction of the rubber track, and it is an object to provide a core for rubber track and a rubber track that can surely prevent cutting of the steel cords due to corrosion, as well as cutting of the tensile reinforcements due to abnormal tensile force.

Means to Solve the Problem

In the present invention, the cores are respectively embedded in the rubber track body in a row with one another, each core comprising a pair of wing portions, an engagement section for engaging with a sprocket located in the center region in the longitudinal direction of the core, and guide projections provided on both ends of the engaging section and projecting from the upper surface of the wings. The guide projections further extend from the lower surface of the wings and form a tensile force carrying portion for carrying the tensile force in the circumferential direction of the rubber track in connection with the adjoining cores.

According to another object, between the adjoining cores in the body, a fixation belt layer in the circumferential direction of the rubber track is positioned on a similar plane to a connecting surface of the tensile force carrying sections for connecting the adjoining cores in the body.

According to another object, the fixation belt layer is laid on the entire length in the circumferential direction of the rubber track, and a part of the tensile force is carried thereon.

Effects of the Invention

According to the present invention, the tensile force of the rubber track is carried by a core chain connected by tensile force carrying sections, thereby certainly preventing cutting of the tensile reinforcements due to the corrosion of the steel cords of the rubber track.

Further, since the tensile force carrying sections are formed so that the guide projections extend to positions in the direction of the outer periphery of the rubber track that are beyond the outer peripheral-side surface of the wing sections, it is possible to provide a fixation belt layer composed of the steel cords at the outer peripheral-side position under the wings. Further, it is possible to effectively oppose the tensile force acting in the circumferential direction by the core chain, and further, it is possible to decrease the tensile force carried by the fixation belt layer at the time when the abnormal tensile force occurs.

Further, since the tensile force carrying sections and the fixation belt layer are located at the same position in the thickness direction of the core, it is possible to maintain the engagement of the tensile force carrying sections of the adjoining cores. In addition, the rubber track can be smoothly bended without interference from the fixation belt layer and the tensile force carrying sections while being bent in the circumferential direction.

Further, since the fixation belt layer can be also embedded over the entire length in the circumferential direction of the rubber track endlessly, it can be easily laid in the rubber track. In this case, although both the fixation belt layer and the tensile force carrying sections carry the tensile force acting on the rubber track, in case abnormal tensile force occurs, cutting of the fixation belt layer is effectively reduced by the tensile force carrying sections.

BRIEF DESCRIPTION OF THE DRAWINGS

FIG. 1A shows a part of the outer peripheral surface (tread); FIG. 1B is a view of a part of the circumferential direction seen from the lateral direction of the rubber track; FIG. 1C shows a part of the inner peripheral surface; and FIG. 1D is a section taken on the line X-X in FIG. 1A and FIG. 1C.

FIG. 3A is a view seen from one side in the lateral direction of the core; FIG. 3B is a view seen from one side in the thickness direction of the core; FIG. 3C is a view seen from one end in the longitudinal direction of the core; FIG. 3D is a view seen from the other side in the lateral direction of the core; and FIG. 3E is a view from the other side in the thickness direction of the core.

FIG. 12A is a partially sectional view of a rubber track, and FIG. 12B is a side view of an endless track travelling device.

Figure 1A:
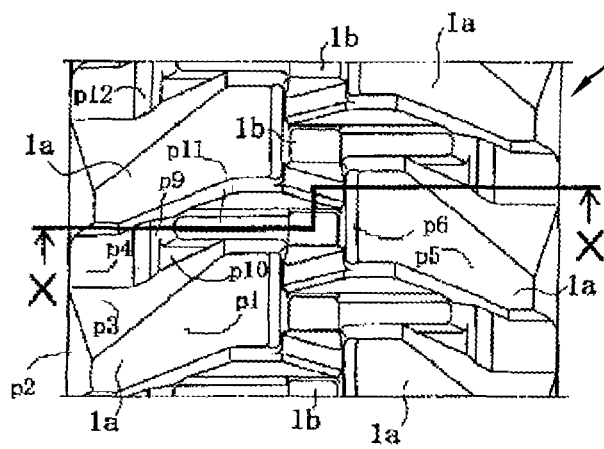
FIGS. 1A-1D show a rubber track related to the present invention.

EXPLANATION OF REFERENCED NUMERALS 1a a rubber track body
2 a fixation belt layer
3 a core
3b an engagement section
3c a wing
4 a tensile force carrying section
4a the first tensile force carrying section
4b the second tensile force carrying section
a1 a surface
a2 a guide projective extending section
a3 a guide projective extending section
a4 the first surface portion
a5 the second surface portion
A a coupled driving wheel
L1 the distance
L2 the distance
M an endless track travelling device
S a driving wheel

PREFERRED EMBODIMENT OF THE INVENTION

The embodiments of the present invention are explained as follows with reference to FIGS. 1 to 8.

Figure 1B:
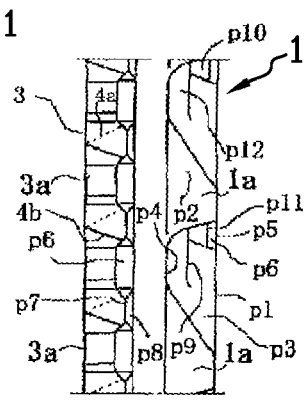
Figure 1C:
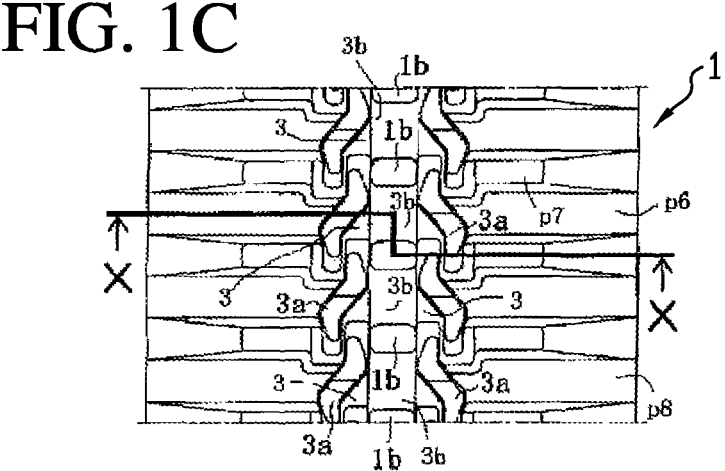
Figure 1D:
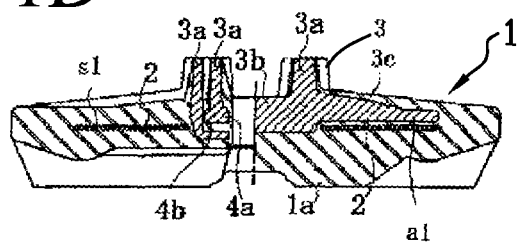

FIGS. 1A-1D show a rubber track related to the present invention. FIG. 1A shows a part of the outer peripheral surface (tread); FIG. 1B is a view of a part of the circumferential direction seen from the lateral direction of the rubber track; FIG. 1C shows a part of the inner peripheral surface; and FIG. 1D is a section taken on line X-X in FIG. 1A and FIG. 1D.

Figure 12A:
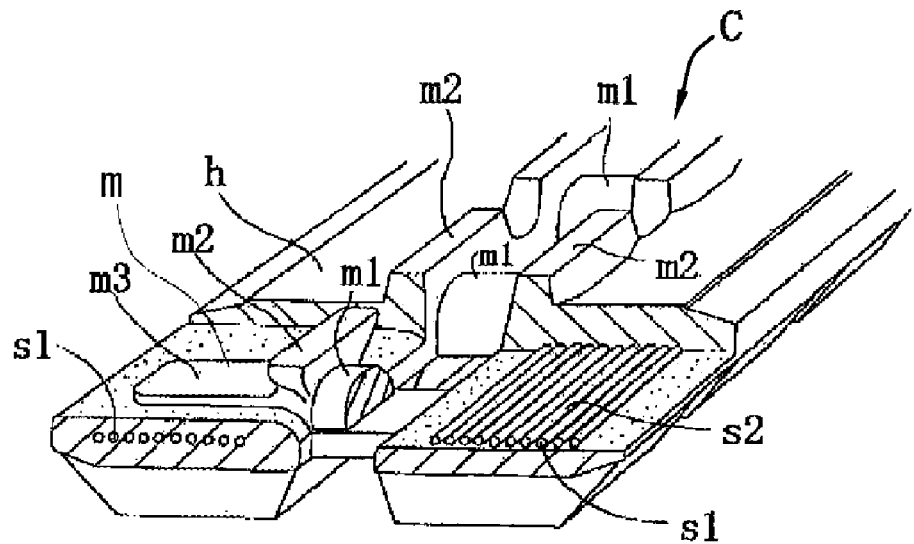
FIGS. 12A and 12B relate to a conventional example.
Figure 12B:
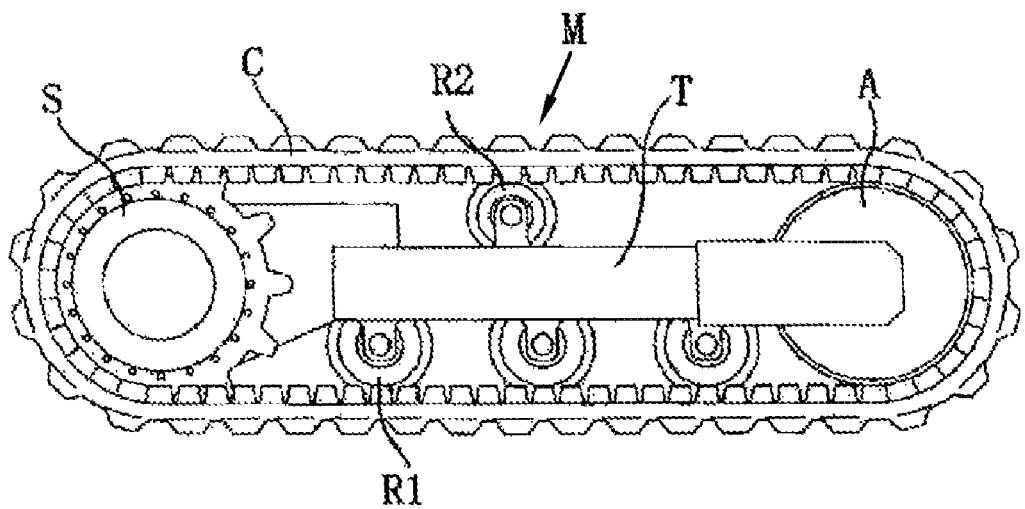
Figure 13:
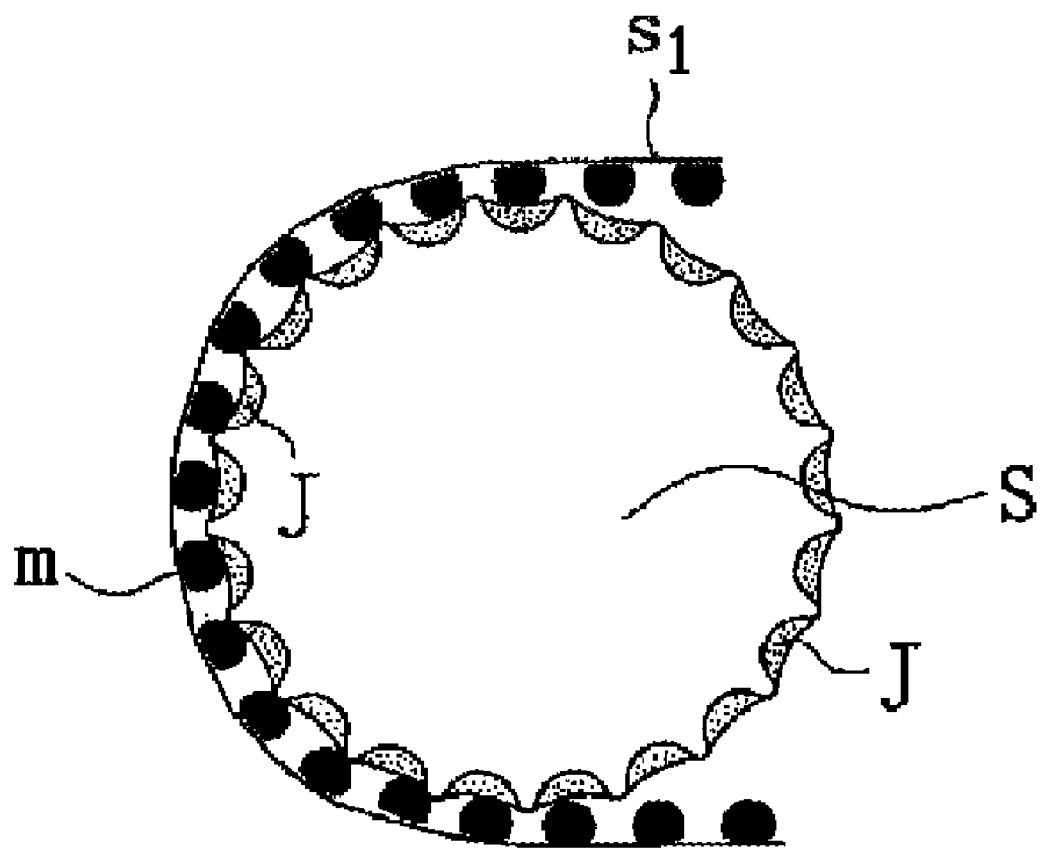
FIG. 13 relates to a conventional example, being an explanatory view seen from the side showing the circumference of the driving wheel of the travelling device.
Figure 14A:
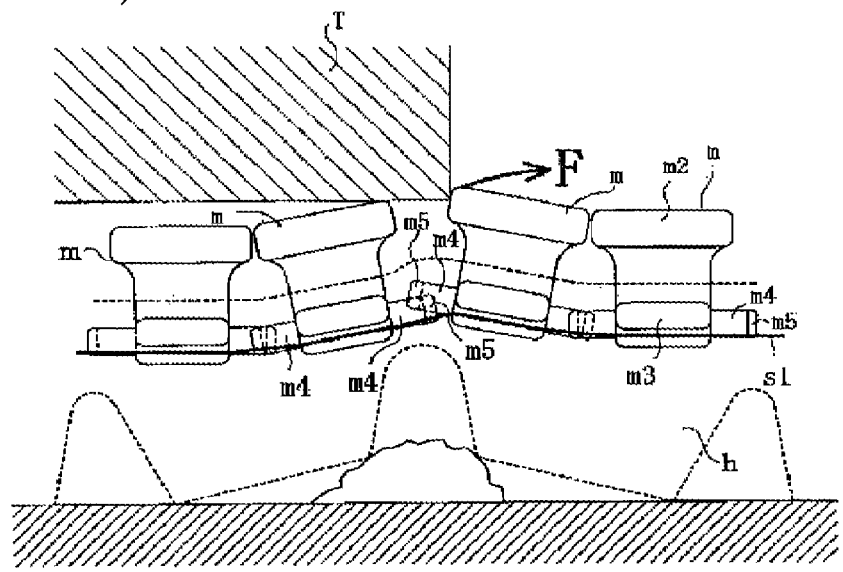
FIGS. 14A and 14B relate to a conventional example, being an explanatory view seen from the side of the core and the steel cords while the rubber track is used.
Figure 14B:
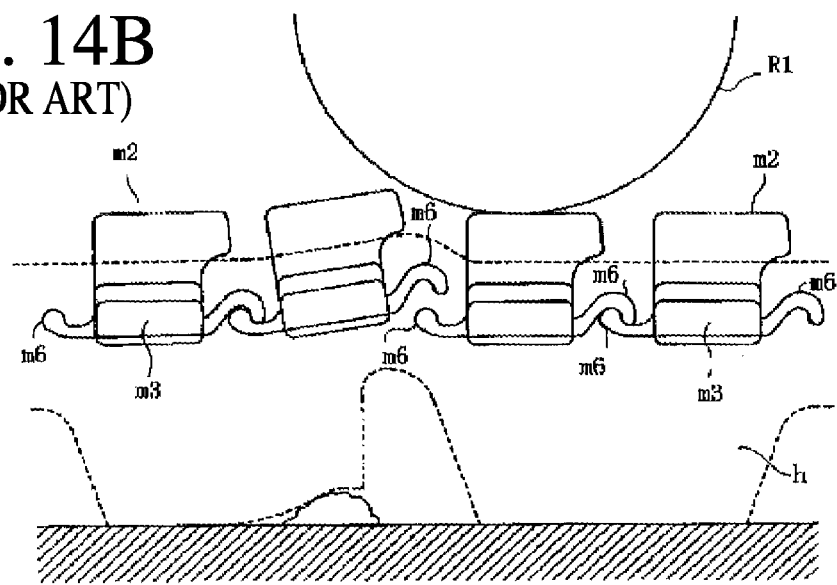

In the figures, 1 is a rubber track relating to the present invention. The rubber track 1 is suspended and used between a coupled driving wheel A and a driving wheel S of an endless track travelling device M shown in FIG. 12B, the rubber track comprising an endless belt which is a rubber track body 1a, a plurality of cores 3 embedded in the belt, and a fixation belt layer 2.

The rubber track body 1a is made of natural rubber and synthetic rubber (IR, SBR, BR, NBR, CR, IIR, EPDM and so on), or a rubber composition combined with cross linking agents such as sulphur, organic peroxides and so on, besides reinforcers (carbon black, white carbon and so on), antioxidants, vulcanization adjuvants, activators, tackifiers, vulcanization accelerators, or thermoplastic resin such as urethane rubber, semi-rigid and flexible polyvinyl chloride resin and so on. In FIGS. 1A-1D, P1 to P12 show a pattern on the surface of the rubber track, and 1b is a hole in which a sprocket is interfitted.

A fixation belt layer 2 is formed in the rubber track body 1a over the entire circumference thereof. The fixation belt layer 2 is to maintain an engagement of adjoining cores 3, the fixation belt layer being formed by a plurality of steel cords s1, each being twisted from a plurality of steel wires, embedded in the rubber track body 1a so as to be arranged in rows in a monolayer in the lateral direction of the rubber track parallel to the circumferential direction of the rubber track.

The fixation belt layer 2 can be changed suitably. For example, the fixation belt layer 2 may be made of materials such as vinylon, nylon, tetron or Kevlar instead of the steel cords s1. In this case, the form of the fixation belt layer 2 can be a liner or a cloth. A liner is preferably arranged in rows in a layer shape in accordance with the arrangement of the steel cords s1. A cloth can be arranged biased in rows.

However, the fixation belt layer 2 should have higher strength than the rubber track body 1a.

Figure 2:
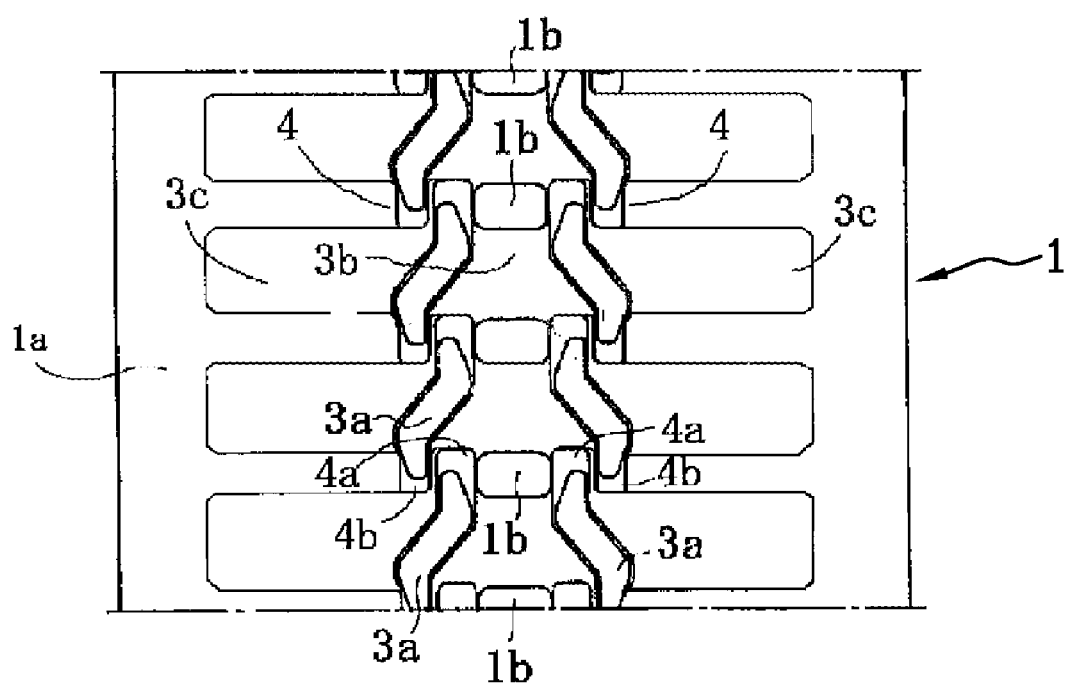
FIG. 2 is an explanatory view of the state in which a plurality of cores is arranged in the rubber track in a row, seen from the inner peripheral side of the rubber track.
Figure 3A:
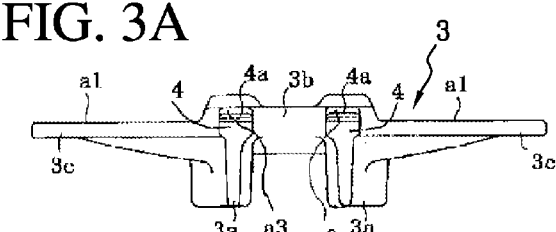
FIGS. 3A-3E show a core embedded in the rubber track.
Figure 3B:
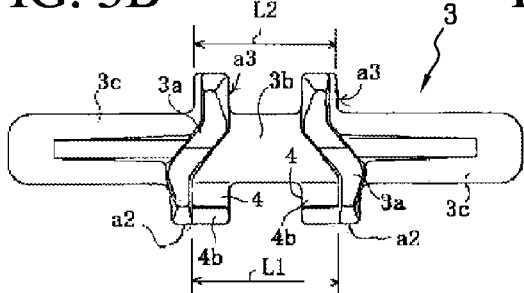
Figure 3C:
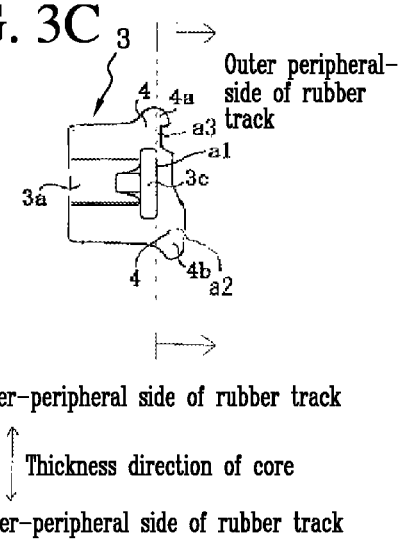
Figure 3D:
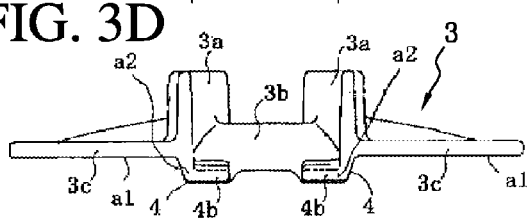
Figure 3E:
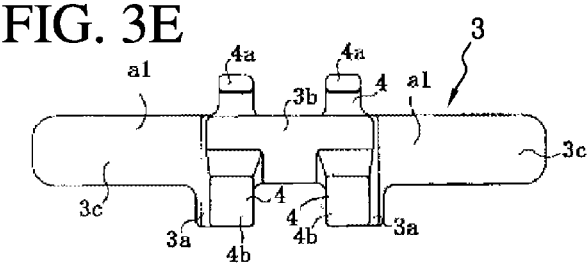
Figure 4:
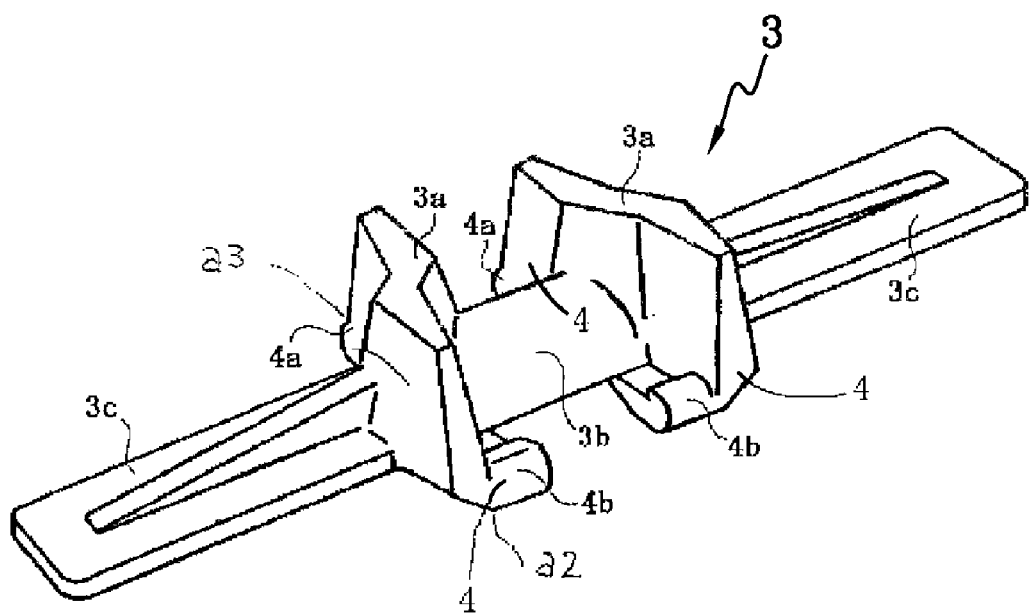
FIG. 4 is a perspective view of the core.

FIG. 2 is a perspective view of the state where a plurality of cores 3 is arranged in rows in the rubber track body 1a, seen from the inner peripheral side of the rubber track. The pattern of the rubber track body 1a is omitted. FIGS. 3A-3E show the core embedded in the rubber track. FIG. 3A is a view seen from one side in the lateral direction of the core; FIG. 3B is a view seen from one side in the thickness direction of the core; FIG. 3C is a view seen from one side in the longitudinal direction of the core; FIG. 3D is a view seen from the other side in the lateral direction of the core; and FIG. 3E is a view from the other side in the thickness direction of the core. FIG. 4 is a perspective view of the core 3.

The cores 3 are embedded in the inner peripheral-side of the rubber track of the fixation belt layer 2 in the rubber track body 1a at a fixed interval in the circumferential direction of the rubber track. Each core 3 comprises an engagement section 3b for engaging the driving wheel S, the engagement section being located in the center region in the longitudinal direction of the core, guide projections 3a for preventing the wheel from coming off on the outer sides of opposite ends in the longitudinal direction of the engagement section 3b, and a pair of wing sections 3c provided on the outer sides of the guide projections 3b. In other words, a pair of wing sections 3c is combined through the engagement section 3b at the center, and the guide projections protruding in a direction of the upper surface-side of the wing sections 3c are provided on both sides of the engagement section 3b.

Each guide projection 3a protrudes from the inner peripheral surface of the rubber track body 1a to prevent the rubber track from coming off of a travelling device M when the core 3 is embedded in the rubber track body 1a. Further, the guide projection 3a extends from the engagement section 3b to the buckling side in the lateral direction of the core, with the entire dimension of the guide projection in the thickness direction being greater than the dimension of the engagement section 3b in the thickness direction, and the guide projection 3a has guide projective extending sections a2, a3 reaching positions in the thickness direction of the core that are beyond, in the direction of the outer peripheral-side of the rubber track, a surface a1 of the outer peripheral-side of the rubber track of the wing 3c (bottom surface of the wing). The parts of the core 3 are integrally formed. Here, as shown in FIG. 3, the guide projection 3a has a section extending beyond the surface a1 in the direction of the outer peripheral-side of the rubber track. The extending section extends from the guide projection 3a toward the outer peripheral-side of the rubber track, and utilizes the structure right over the guide projection 3a for strength in the lateral direction of the core 3. Besides, the extending section appears to be provided on the outer peripheral-side of the rubber track against the wing section 3c, whose position overlaps the guide projection 3a when seen from the longitudinal direction of the core 3.

The distance L1 in the longitudinal direction of the core between the inside surfaces of a pair of guide projective extending sections a2, a2 located on one side in the lateral direction of the core (the lower side in FIG. 3B) is longer than the distance L2 in the longitudinal direction of the core between the outside surfaces of a pair of guide projective extending sections a3, a3 located on the other side in the lateral direction of the core (the upper side in FIG. 3B). Accordingly, in each core 3, a pair of guide projections 3a located so as to sandwich the engagement section 3b is arranged in rows with the guide projections of other cores, so as to be sandwiched by another pair of guide projections 3a and so as to sandwich yet another pair of guide projections 3a, as seen from the upper side of the figure.

In cores 3, 3 adjoining one another in the circumferential direction of the rubber track, a pair of guide projective extending sections a3, a3 at one side in the lateral direction of one core 3 is inserted between a pair of guide projective extending sections a2, a2 at the other side in the lateral direction of the other core 3 adjoining thereto. In viewing the rubber track 1 from the lateral direction thereof, the guide projections 3a, 3a of the cores 3, 3 adjoining in the circumferential direction overlap.

Accordingly, when lateral slippage of the rubber track 1 reaches a fixed extent, the side surfaces of the guide projections 3a, 3a of the cores 3, 3 adjoining in the circumferential direction of the rubber track contact one another at the place of the lateral slippage, and slippage is controlled. The controlled range spreads from the position where the slippage occurs to front and rear sides in the circumferential direction of the rubber track, in order, through the guide projections 3a of the other cores 3. When the slippage reaches the rolling wheel R1, the driving wheel S or the coupled driving wheel A shown in FIG. 12B, the force for controlling the lateral slippage becomes strong due to actions for keeping the positions, and thereafter, the lateral slippage is effectively controlled.

Further, since the guide projections 3a, 3a are overlapped in the circumferential direction of the rubber track on the sides sandwiching the engagement section 3b, they are stably and smoothly guided by the driving wheel S, the coupled driving wheel A, the lower-side rolling wheel R1 and the upper-side rolling wheel R2.

A tensile force carrying section 4 integrated with each guide projection 3a is provided on the core 3. Concretely, first tensile force carrying sections 4a, 4a forming male sides are provided on the ends of the outer peripheral-side of the rubber track of a pair of the guide projective extending sections a3, a3. Further, second tensile force carrying sections 4b, 4b forming female sides are formed on the ends of the outer peripheral-side of the rubber track of the inner surfaces of a pair of the guide projective extending sections a2, a2, so as to protrude toward the center in the longitudinal direction of the core. The second tensile force carrying sections 4b, 4b are formed so as to protrude from the engagement section 3b. Accordingly, the tensile force carrying section 4 is reinforced by the guide projection 3a, and the strength for withstanding the tensile force imposed on the rubber track 1 is greatly increased in comparison with the former. Lateral slippage, which is displacement in the lateral direction of the core, can be strongly and stably prevented by the contacting of the guide projective extending sections of the adjoining cores.

The two kinds of tensile force carrying sections, the first and the second tensile force carrying sections 4a, 4b, wherein the relationship between the front and rear cores 3, 3 adjoining in the circumferential direction embedded in the rubber track body 1a is a male and female relationship, are engaged so as to be bent along a surface parallel to both the circumferential direction of the rubber track and the thickness direction of the rubber track to carry the tensile force between the cores 3, 3.

Thus, a construction for engaging the first and the second tensile force carrying sections 4a, 4b may be formed optionally. In this embodiment, one first tensile force carrying section 4a is formed in a hook-shape bent toward the outer peripheral-side of the rubber track, and the second tensile force carrying section 4b is formed in a hook-shape bent toward the interior peripheral-side of the rubber track.

Figure 5:
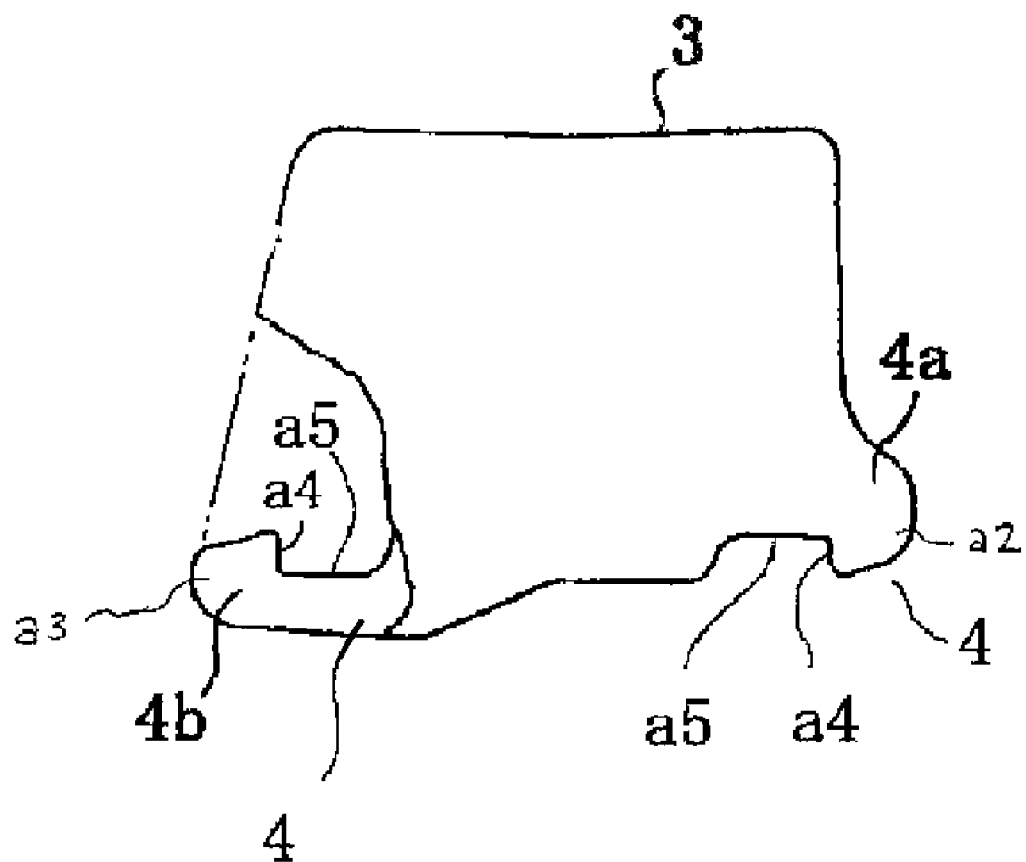
FIG. 5 is a partially broken view of the core seen in the longitudinal direction.

FIG. 5 is a partially broken view of the core 3 seen from the longitudinal direction thereof. As shown in this figure, the first and the second tensile force carrying sections 4a, 4b are provided at positions in the thickness direction of the core that are nearer the outer peripheral-side of the rubber track than is the core 3c. Further, to attempt simplifying the structure or increasing opposition to the tensile force, the first and the second tensile force carrying sections 4a, 4b have a first surface section a4 for receiving pull forces in the lateral direction of the core and a second surface section a5 for receiving push forces in the thickness direction of the core. In this embodiment, to softly cope with the modification of the rubber track body and to strongly cope with the tensile force, the first surface section a4 has a plane almost parallel to the longitudinal direction of the core and the thickness direction of the core, and the second surface section a5 has a plane almost parallel to the longitudinal direction of the core and the lateral direction of the core.

It is preferable that the tensile force carrying sections 4 are not provided at a position overlapped with the engagement section 3b or the fixation belt layer 2 in the rubber track 1, seen from the thickness (vertical) direction of the rubber track. The reason for this is that, when the rubber track 1 is wound on the traveling device M, the tensile force carrying section 4 would interfere with the fixation belt layer 2 and the driving wheel S engaged with the engagement section 3b, and then, any of the tensile force carrying section 4, the driving wheel S or the fixation belt layer 2 could be damaged. Accordingly, in the rubber track 1 in which the fixation belt layer 2 is arranged as shown in FIG. 1D, it is preferable that the tensile force carrying section 4 is provided at the place where the guide projection 3a exists as above-mentioned. However, it is not limited to this. The tensile force carrying section may be provided at an optional position in the longitudinal direction of the core of the wing section 3c by changing the arrangement of the fixation belt layer 2.

The position of the tensile force carrying section 4 of the core 3 in the thickness direction of the rubber track 1 is in a plane including the position in the thickness direction of the rubber track of the fixation belt layer 2 and parallel to both the circumferential direction of the rubber track and the lateral direction of the rubber track. Accordingly, the center of curvature of an engaging place (the place where the first surface section a4 and the second surface section a5 exist) of the tensile force carrying section, which is a bent center of the rubber track 1, is positioned on a plane including the fixation belt layer 2. On the other hand, since the fixation belt layer 2 causes the rubber track body 1a to have no stretch, it forms a sectional neutral line of bending around a line of the lateral direction of the rubber track 1. Therefore, the engaging place of the tensile force carrying section 4 comes to be bent without the fixation belt layer 2 deforming elastically. In this way, since the rubber track is apt to bend to agree with the position of the sectional neutral line, it can smoothly bend without the fixation belt layer 2 and the tensile force carrying section 4 interfering.

Figure 6A:
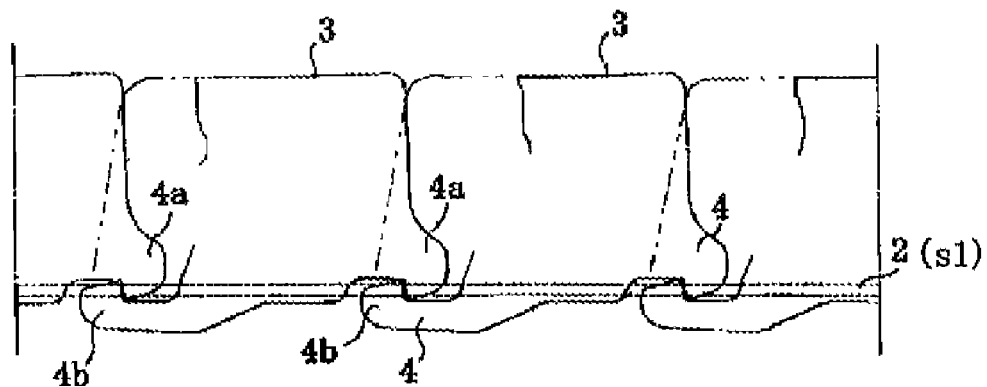
FIGS. 6A-6C are explanatory views seen from the side, showing the relative positions of the cores and the positional relation between the tensile force carrying sections and the fixation belt layer of the core in the rubber track.
Figures 6B, 6C:
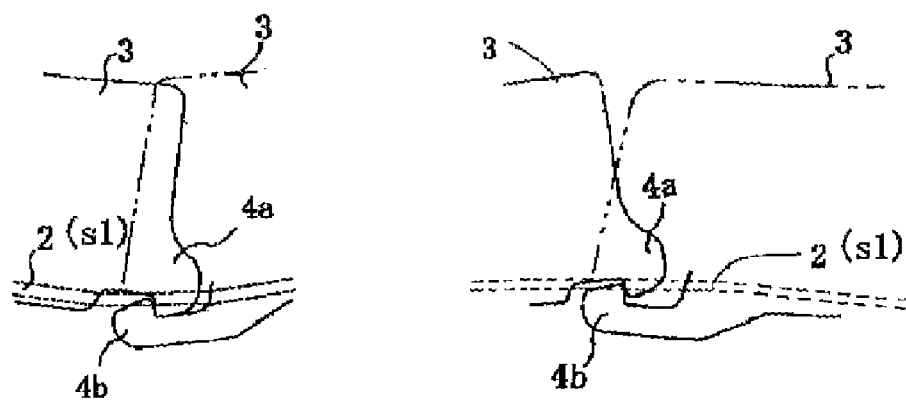

FIG. 6 is an explanatory view seen from the side, which shows a positional relation between the tensile force carrying section 4 of the core 3 and the fixation belt layer 2 in the rubber track 1 and relative positions of two cores. When the circumferential direction of the rubber track is a line, as shown in FIG. 6A, the cores 3 form a line, and the fixation belt layer 2 forms a line parallel to a row of the cores. When the bending force acts on either side in the thickness direction of the rubber track, as shown in FIG. 6B or FIG. 6C, the circumferential direction of the rubber track is smoothly bent to the corresponding side in the thickness direction of the rubber track on the engaging place of the tensile force carrying section 4. Accordingly, the rubber track 1 moves around, even at the positions of the driving wheel S and the coupled driving wheel A, without a hindrance. Besides, even if the rubber track 1 rides on stones, it bends upwardly without hindrance to riding over them. Therefore, the tensile force carrying sections 4 do not fail to engage.

It is preferable that the tensile force carrying section 4 and the fixation belt layer 2 in the rubber track 1 exist on one plane along both the circumferential direction of the rubber track and the lateral direction of the rubber track so that their positions closely agree with each other. However, the fixation belt layer 2 may be located more toward the outer peripheral-side or the inner peripheral-side than the tensile force carrying section 4. Thus, the fixation belt layer 2 exists on the plane including the position of the tensile force carrying section 4 in the illustrated embodiments of the present invention.

Figure 7A:
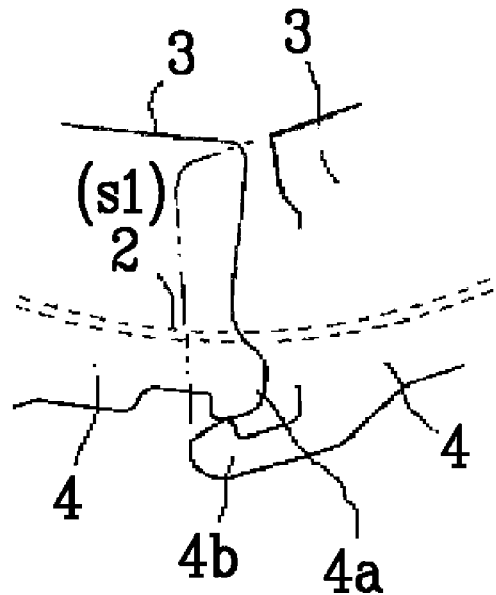
FIGS. 7A and 7B are explanatory views seen from the side showing an operating state of the cores due to a bad positional relation between the tensile force carrying sections and the fixation belt layer.

FIG. 7 is an explanatory view seen from the side, which shows an action of the cores 3 caused by a bad positional relation between the tensile force carrying section 4 and the fixation belt layer 2. As shown in FIG. 7A, when embedding the fixation belt layer 2 in the rubber track so that the position in the thickness direction of the rubber track is located excessively on the inner peripheral-side thereof, the interval between the relative tensile force carrying sections 4, 4 of the cores 3, 3 adjoining, front and rear, in the circumferential direction of the rubber track expands at the winding section of the driving wheel S or the coupled driving wheel S of the travelling device M. In this situation, the male and female tensile force carrying sections 4a, 4b can not maintain their engagement.

Figure 7B:
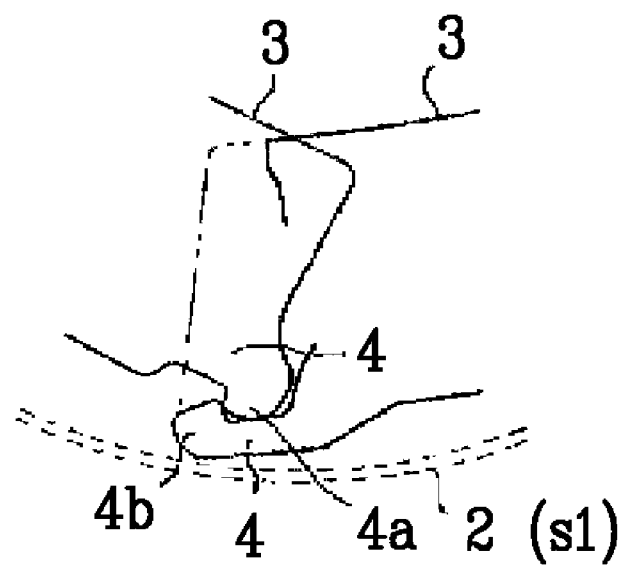

On the other hand, as shown in FIG. 7B, when the fixation belt layer 2 is embedded in the rubber track so that its position in the thickness direction of the rubber track is located too far toward the outer peripheral-side relative to the tensile force carrying section 4, the interval between the relative male and female tensile force carrying sections 4a, 4b of the cores 3, 3 adjoining on the front and rear in the circumferential direction of the rubber track becomes narrow at the winding section of the driving wheel S or the coupled driving wheel S of the travelling device M. In this situation, the fixation belt layer 2 and the tensile force carrying section 4 interfere with each other. In consequence, the male and female tensile force carrying sections 4a, 4b are displaced too much to close-side and bring about the members' collisions, and therefore, the curve around the line of the lateral direction of the rubber track is controlled so that the curvature is not higher than a constant degree, and therefore, the rubber track 1 does not wind on the travelling device M. Accordingly, it is necessary to arrange the fixation belt layer 2 in accordance with the size of the rubber track 1 or the use situation such that there is no trouble.

Figure 8:
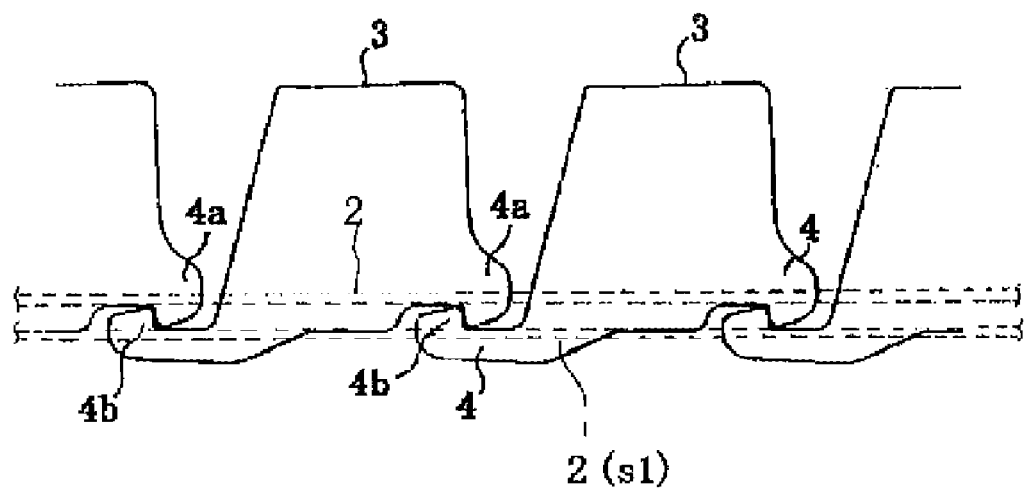
FIG. 8 is an explanatory view seen from the side, showing the relative positions of the cores and the positional relation between the tensile force carrying sections and two fixation belt layers in the rubber track.

FIG. 8 is an explanatory view seen from the side, which shows a positional relation between the tensile force carrying section 4 and two fixation belt layers 2, 2 in the rubber track 1.

As for the fixation belt layer 2, only one layer may be provided as shown in FIG. 1D, or two layers may be provided near the tensile force carrying section 4 so as to sandwich it from the outer peripheral-side and the inner peripheral-side as shown in FIG. 8, or a greater number of layers may be provided. In this case, the fixation belt layer 2 is not separated from the tensile force carrying section 4 too much. According to this, the rubber track can be smoothly bent in the circumferential direction, and besides, the fixation belt layer 2 can act much more to fix the core 3 on the rubber track 1.

In addition, in FIGS. 1A, 1B, 1C, reference numbers P1 to P13 are used to make the correspondence of each section clear.

Figure 9:
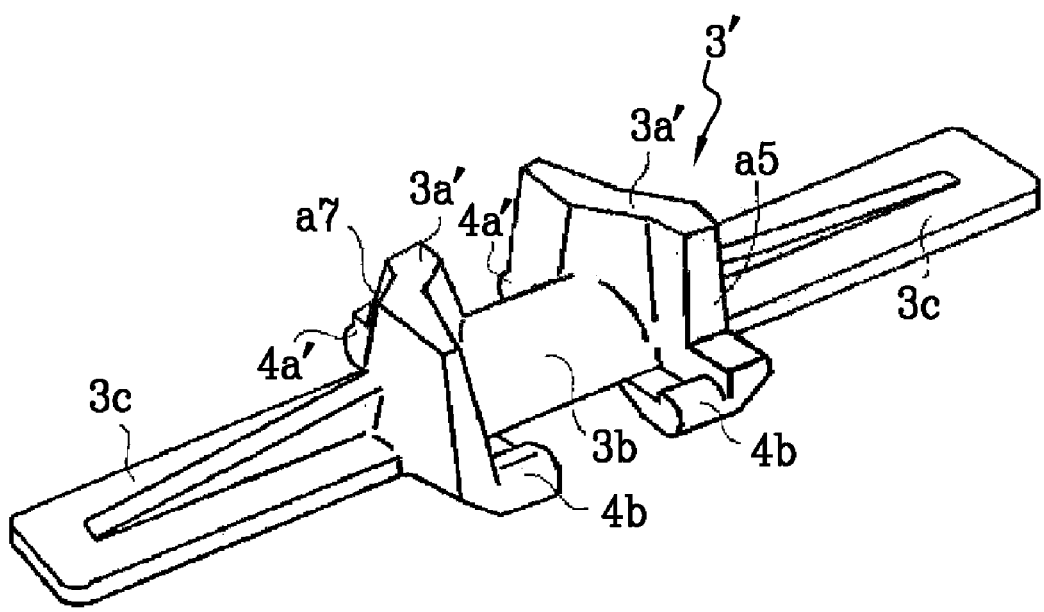
FIG. 9 is a perspective view of a modified core.

FIG. 9 is a perspective view of a modification of the core 3.

The core 3' in this modification has two notches a6, a7 formed by excising a part of the guide projections 3a, 3a of the core 3 in FIG. 3 and FIG. 4.

In this case, without spoiling the guiding function of the guide projections 3a', 3a', a notch a6 of one guide projection 3a' is formed on one side in the lateral direction of the core, and a notch a7 of the other guide projection 3a' is formed on the other side in the lateral direction of the core. The size of the notch a6 or a7 in the lateral direction of the core is made the length, for example, that the tensile force carrying section 4 protrudes from the engagement section 3b to one side in the lateral direction of the core. The size in the thickness direction of the core is made larger than a half of the full length in the thickness direction of the core 3'. The form or the position of the notches a6, a7 may be changed suitably.

In this modification, the cores 3' are embedded in the rubber track body 1a at a fixed interval in the circumferential direction of the rubber track, the same as the cores shown in FIG. 3 and FIG. 4. The guide projections 3a' of the embedded cores 3' are arranged in a stagger on the inner periphery of the rubber track, the same as the ones disclosed in FIG. 2 of the patent literature No. 2. In this case also, the guiding function of the guide projections 3a' is not spoiled at all. The modified core 3' is useful because the cost can be diminished and the travelling performance can be efficiently promoted by making the core lightweight.

Figure 10A:
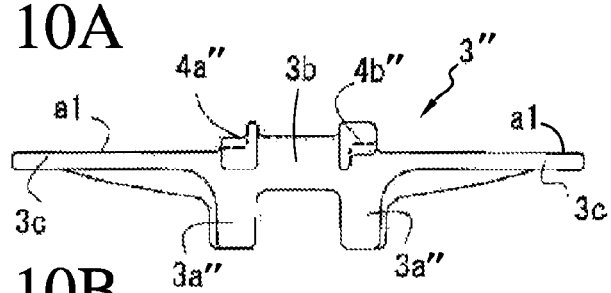
FIGS. 10A-10E are views showing another example of a modified core.
Figure 10B:
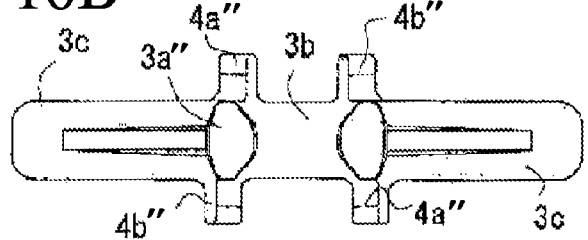
Figure 10C:
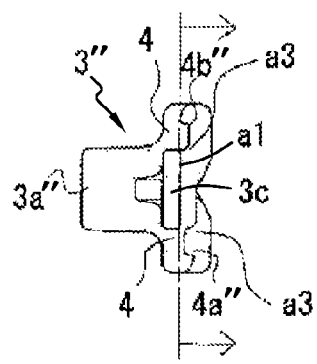
Figure 10D:
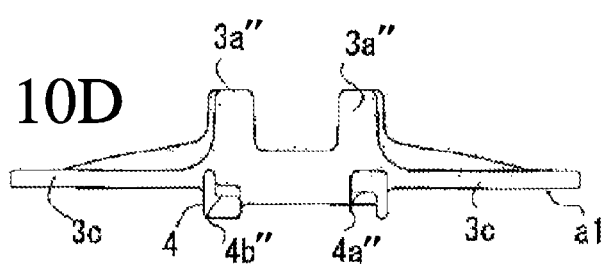
Figure 10E:
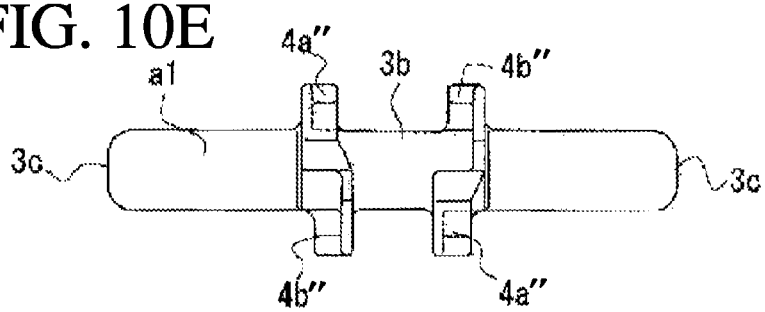

FIGS. 10A-10E show a core 3" of another embodiment. The core 3" is embedded in the above-mentioned rubber track. FIG. 10A is a view seen from one side in the lateral direction of the core; FIG. 10B is a view seen from one side in the thickness direction of the core; FIG. 10C is a view seen from one side in the longitudinal direction of the core; FIG. 10D is a view seen from the other side in the lateral direction of the core; and FIG. 10E is a view seen from the other side in the thickness direction of the core. The elements have the same reference numbers as the corresponding elements of FIGS. 3A-3E.

The core 3" in FIGS. 10A-10E is different from the core 3 in FIGS. 3a-3E in that the relations between the tensile force carrying sections 4a", 4b" differ on the right and left sides of the core. According to the above-mentioned, the first tensile force carrying section 4a" is bent toward the outer peripheral-side of the rubber track to form a hook shape, and the second tensile force carrying section 4b" is bent toward the inner peripheral-side of the rubber track to form a hook shape. In this embodiment, as shown in FIG. 10B, the tensile force carrying sections 4a", 4b" are located on the right and left on the top of the figure, and the tensile force carrying sections 4b", 4a" are located on the right and left on the bottom of the figure. According to this, in this embodiment, the relations between the tensile force carrying sections 4a", 4b" are reversed for the right and left sides of the core 3".

Figure 11A:
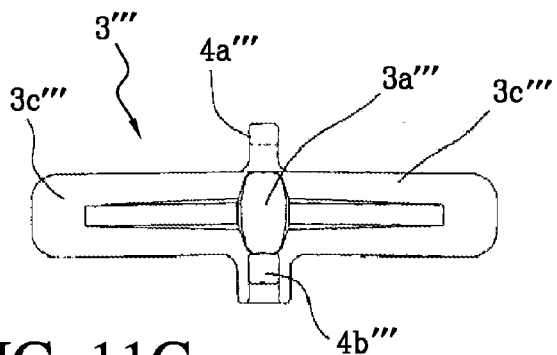
FIGS. 11A-11F are views showing yet another example of a modified core.
Figure 11B:
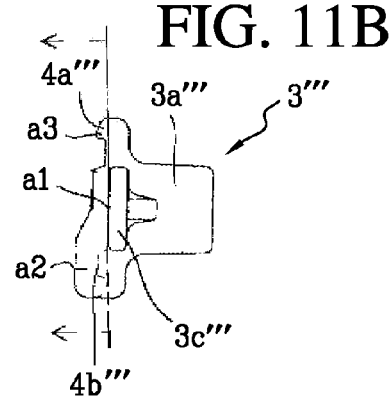
Figure 11C:
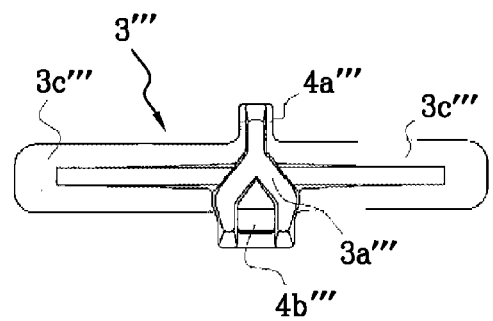
Figure 11D:
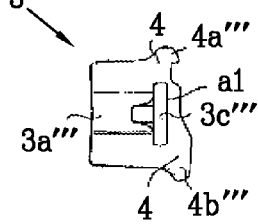
Figure 11E:
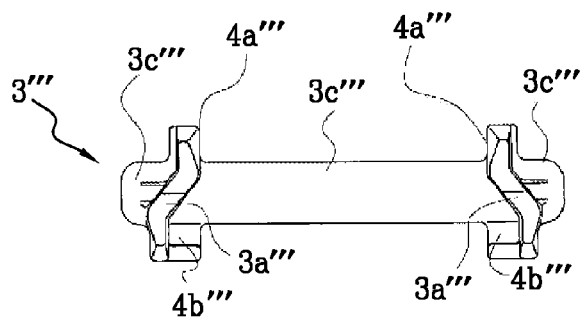
Figure 11F:
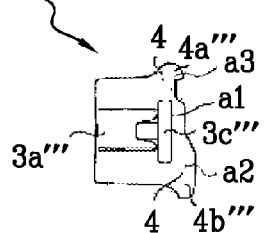

FIGS. 11A-11F show a core 3''' of another embodiment, each of FIGS. 11A, 11C, 11E being a view seen from one side in the thickness direction of the core, and each of FIGS. 11B, 11D, 11F being a view seen from one side in the longitudinal direction of each core.

In the embodiments shown in FIGS. 11A to 11D, the guide projection 3a''' is provided at the center of the core 3''', and the engagement section 3b is not provided differently from the core 3 in FIGS. 3A-3E.

The rubber track using this core is applied to a multi-wheeled travelling device having a twin wheel structure wherein two driving wheels are arranged that leave an interval between them, not to an endless track travelling device of a construction machine having a sprocket structure. In the endless track travelling device, the driving force is transmitted by the friction between the outer periphery of the driving wheel and the rubber track body, and the twin wheels are arranged so as to sandwich the guide projection 3a'''.

The rubber track using the core shown in FIGS. 11E and 11F is applied similarly to the multiwheeled travelling device having the twin wheel structure, and the guide projections 3a''' are arranged on both ends in the longitudinal direction of the core so as to sandwich the twin wheels. That is, although the wing sections 3c''' are located on both ends of the core in each of the previous embodiments, the main section of the wing section 3c''' in the present embodiment is located on the center region sandwiched between the guide projections 3a'''. In this embodiment, the twin wheels ride on the center region, and therefore, the wing sections 3c''' are unessential because they are located on both ends of the core. The fixation belt layer is provided at the entire surface of the lower side of the wing section 3c''' on the center region (the lower side of the wing section 3c''' of both ends, if there is space) or near the guide projection 3a'''. Besides, the guide projective extending sections a2, a3 are so constructed that each guide projection 3a''' extends protrudently in the lateral direction of the core from the wing section 3c''', while maintaining the entire length in the thickness direction of the core larger than that in the thickness direction of the core of the central wing section 3c''', and reaches a position in the thickness direction of the core beyond the lower surface of the wing section 3c''' in a direction toward the outer peripheral-side of the rubber track.

In each embodiment, the fixation belt layer 2 is laid over the full circumference of the rubber track and carries a part of the tensile force to be carried by the tensile force carrying section. However, the fixation belt layer only maintains the engagement between the tensile force carrying sections 4a''', 4b''' of at least adjoining cores, and is not necessarily formed endless.

For example, it is hard to cut the fixation belt layer 2 towards both ends in the longitudinal direction of the core due to deflection of the wing section thereof. However, even if the fixation belt layer 2 of the center region in the longitudinal direction of the core is cut, the function for maintaining the engagement of the tensile force carrying sections 4a''', 4b''' of the core is kept if the fixation belt layer on the end region is not cut.

In this case, since it is hard to cut the fixation belt layer 2 towards both ends in the longitudinal direction of the core due to deflection of the wing section thereof, the fixation belt layer 2 can be embedded in only both ends in the longitudinal direction of the core and not the center region, which is easily ruptured.

On the other hand, in laying the fixation belt layer 2 in the rubber track endlessly, the tensile force carrying section carries the tensile force of the rubber track when the fixation belt layer is overlapped. Therefore, the overlapping length may be shorter than that of the tensile reinforcing layer in the conventional rubber track, or another lap can be unnecessary.

Accordingly, when winding the rubber track on the travelling device, the separation of the end of the outer peripheral-side of the fixation belt layer due to shearing modification based on the difference between the winding diameters of the fixation belt layer of the outer peripheral-side and the inner peripheral-side of the overlapped portion of the fixation belt layer can be prevented by shortening the overlapping length (see Japanese patent laid open application No. 09-109948 for a detailed explanation of this conventional problem).

As another embodiment, the fixation belt layer may be divided in two, three or more sections to be laid. In this case, it is preferable that each broken point of the fixation belt layer be shifted to the right and the left in the lateral direction of the engagement section of the core. Alternatively, the fixation belt layer may be arranged so as to overlap in the thickness direction of the core or the longitudinal direction thereof without providing the broken points.

Besides, when the fixation belt layer is arranged so as to overlap in the thickness direction of the core, the position of the fixation belt layer is not in perfect harmony with the position, in the thickness direction of the core, of the engagement section of the tensile force carrying section. However, if it is in a range that does not deviate from a purpose of the invention, some gaps are forgiven.

Although the fixation belt layer is provided to the right and left of the core, the above-mentioned dividing points may not be provided at the same position of the core. For example, when dividing the fixation belt layer into two or three, it can be that a dividing point is provided on the right side of one core and the left side is continuous, and a dividing point is provided on the left side of the other core shifted from one core, and the right side is continuous.

Besides, in the above-mentioned explanation, the tensile force carrying sections 4a, 4b are so constructed that the first surface section a4 has a plane almost parallel to both the longitudinal direction of the core and the thickness direction of the core, and the second surface section a5 has a plane almost parallel to both the longitudinal direction of the core and the lateral direction of the core. The first tensile force carrying section 4a is bent toward the outer peripheral-side of the rubber track to form a hook shape, and the second tensile force carrying section 4b is bent toward the inner peripheral-side of the rubber track to form a hook shape.

However, if the tensile force carrying section can flexibly keep up with the modification of the rubber track body and can strongly oppose the tensile force, the shape thereof is not limited to the above-mentioned one.

For example, the first surface section a4 and the second surface section a5 may be respectively a curved surface or a spherical surface. In this case, when the first surface section a4 and the second surface section a5 of the tensile force carrying section 4a are convex curved surfaces (or spherical surfaces), the first surface section a4 and the second surface section a5 of the tensile force carrying section 4b are concave curved surfaces (or spherical surfaces). Even the reverse of this is good.

Alternatively, a polygonal pole or a polygonal cone may be provided on the second surface section a5 of the tensile force carrying section 4a. In this case, a hole for receiving the polygonal pole or the polygonal cone (or cylinder or hemisphere) of the second surface section a5 of the tensile force carrying section 4a is provided on the second surface section a5 of the tensile force carrying section 4b. In this case, if the polygonal pole or the polygonal cone can strongly oppose the tensile force of the second surface section a5 of the tensile force carrying section 4a, the first surface section a4 of the tensile force carrying sections 4a, 4b can be omitted, because the relation of the male and female of the engagement between the tensile force carrying section 4a and the tensile force carrying section 4b is effected by the polygonal pole or the polygonal cone (or cylinder or hemisphere). However, it is assumed that the curved center in the thickness direction of the core where there is engagement by the tensile force carrying section 4a and the tensile force carrying section 4b is the same position as the fixation belt layer of the outer peripheral-side of the rubber track on the condition that the rubber track can be smoothly bent without an interference between the fixation belt layer 2 and the tensile force carrying section.

As mentioned above, the fixation belt layer is different from conventional tensile reinforcement in that it does not need to be endless. For example, even if a steel cord having the same material is used, conventional tensile reinforcement must be endless to oppose the tensile force, whereas the fixation belt layer maintains the engagement between the tensile force carrying sections 4a, 4b and does not interfere with the curvature of the engagement.

Figure 15:
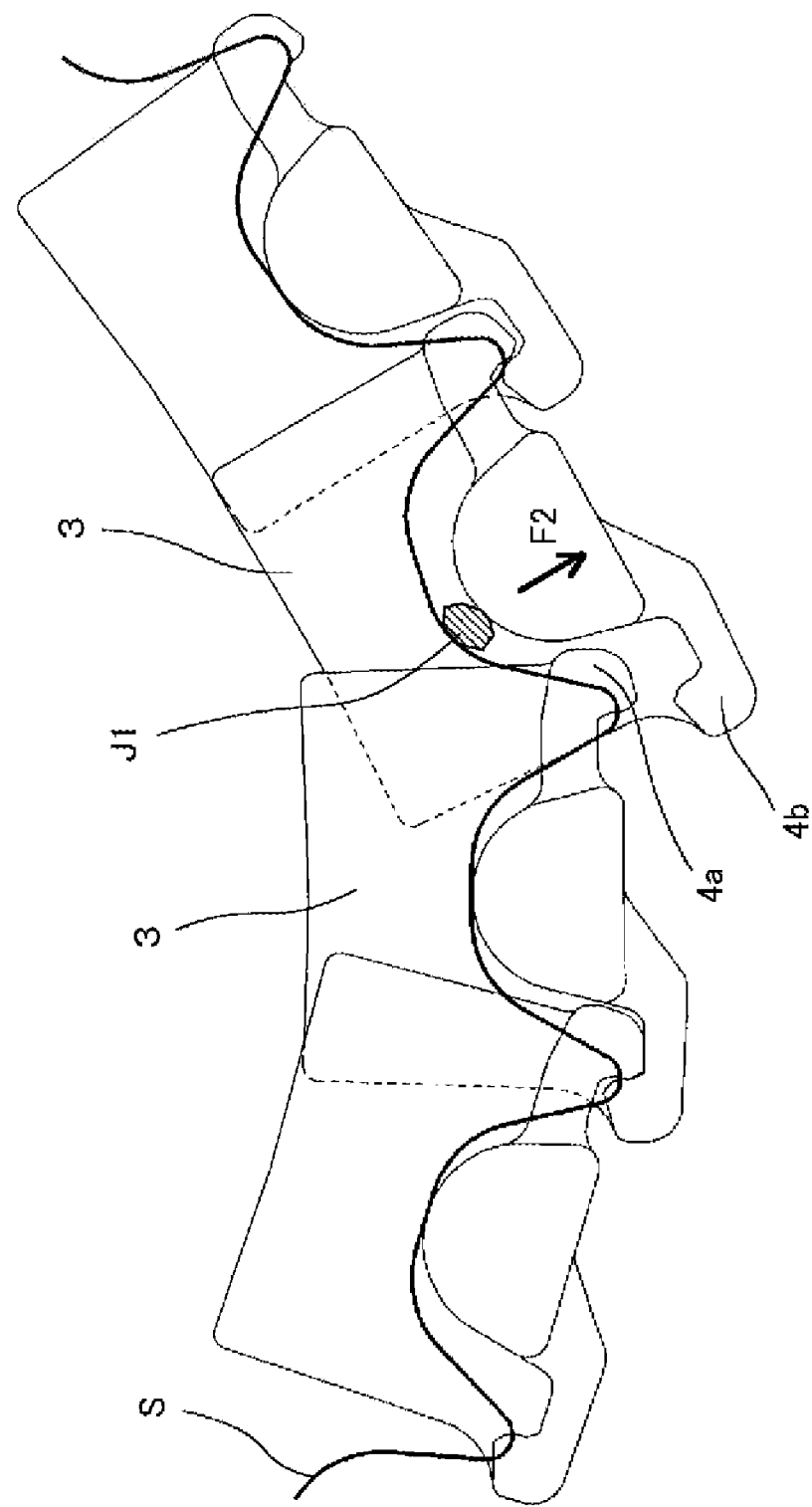
FIG. 15 is an explanatory view showing the state when the core is used.

An abnormal tensile force (high load condition) caused by the core m lifting from the bottom of the sprocket C caused by soil J stuffing the bottom of the sprocket can be avoided through the first tensile force carrying section 4a and the second tensile force carrying section 4b. On the other hand, as shown in FIG. 15, when sand and stone J1 partially creep into a space between the sprocket C and the rubber track 1a and a force F2 for pressing one core in the outer circumferential direction of the rubber track is added, the engagement between the first tensile carrying section 4a and the second tensile carrying section 4b may get out of joint.

Figure 16:
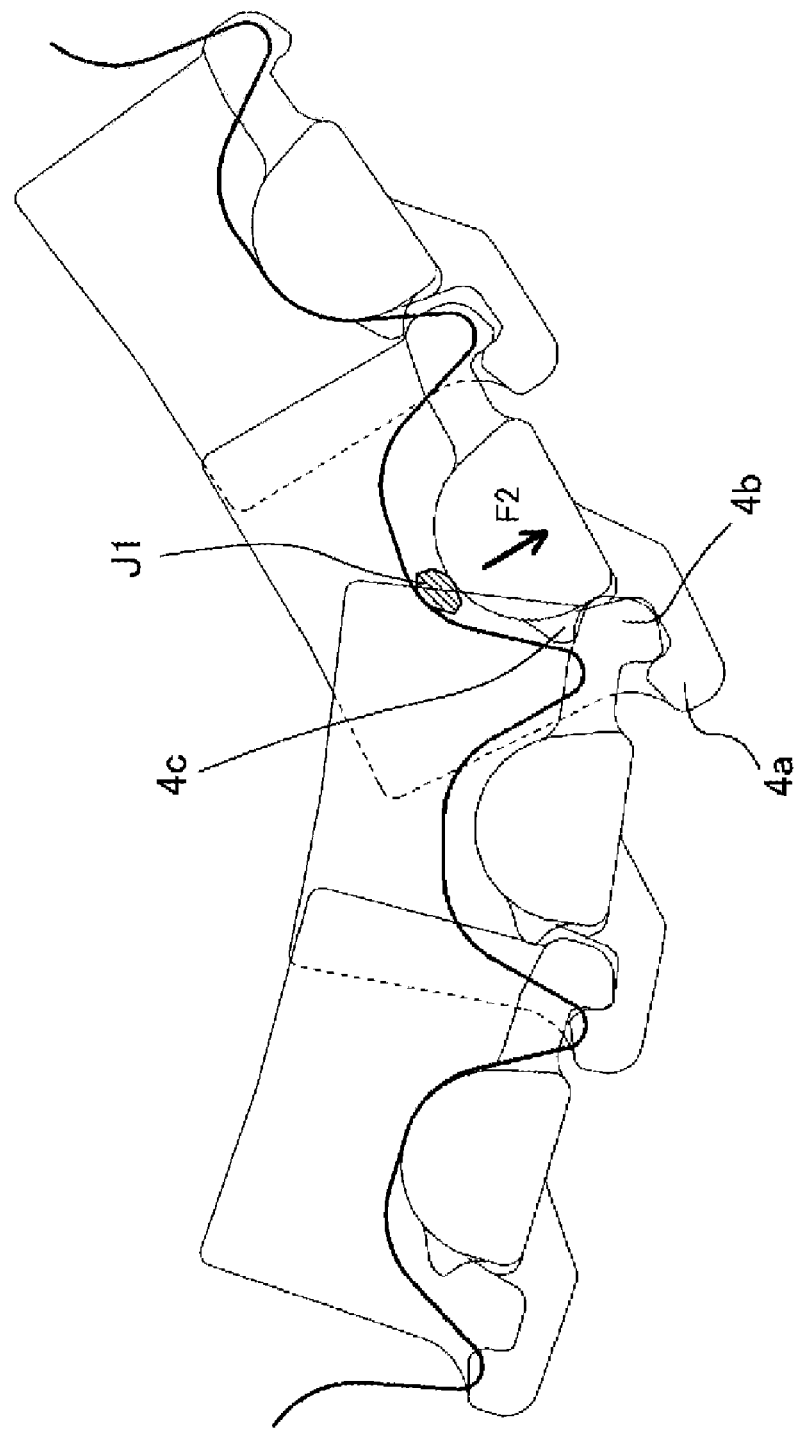
FIG. 16 is an explanatory view showing the state when a core of another example is used.

FIG. 16 shows the situation in which the core has a projecting section 4c to the side of the first tensile force carrying section 4a in order to deal with the above-mentioned case. According to the projecting section 4c, even if the force for pushing the core toward the outer peripheral-side of the rubber track partially acts due to the stuffing of the sand and stone J1, the projecting section 4c bumps against and stops the second tensile force carrying section 4b. In this way, the second tensile force carrying section 4b is sandwiched between the first tensile force carrying section 4b and the projecting section 4c.

Figure 17:
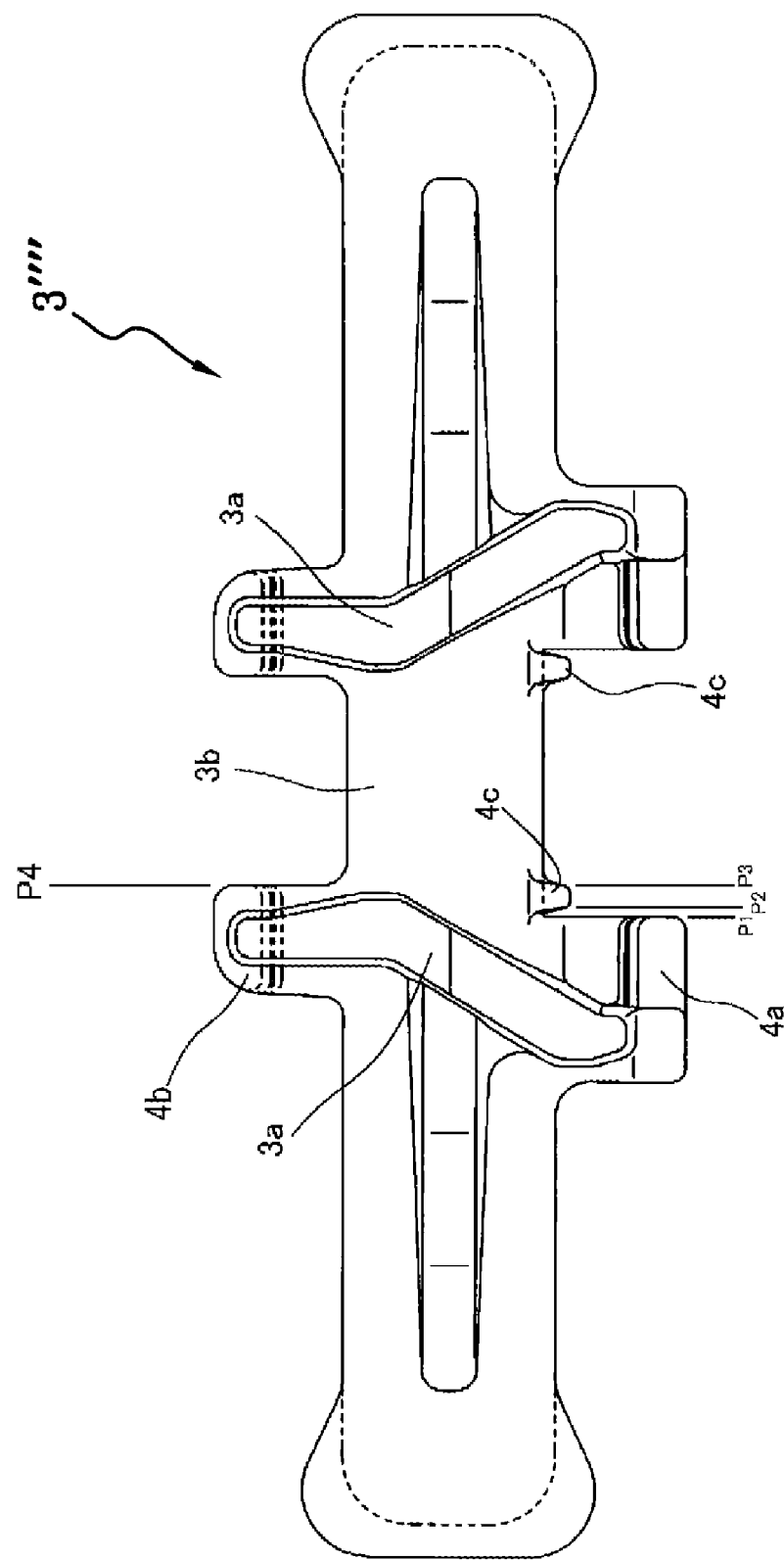
FIG. 17 is a plan view of the core in FIG. 16.

FIG. 17 is a plan view of the core 3'''' having the projecting section 4c. The projecting section 4c protrudes from the engagement section 3b of the core in the same direction as the first tensile force carrying section 4a. The projecting section 4c is located at positions P2, P3 that are laterally inside an inside position P1 of the first tensile force carrying section 4a between the guide projections 3a, the positions P2, P3 not overlapping the first tensile force carrying section 4a in the plan view. The positions P1, P2 and P3 are in the longitudinal direction of the core. The second tensile force carrying section 4b protrudes at an inside position P4 of the guide projection 3a rather than the inside position P1 of the first tensile force carrying section 4a, and the position P4 is laterally inward of the position P2. Therefore, when combining two cores, the second tensile force carrying section 4b overlaps the projecting section 4c in the plan view. The reason that the projecting section 4c is arranged at the position that does not overlap the first tensile force carrying section 4a is to easily make a mold for molding the core.

Figure 18:
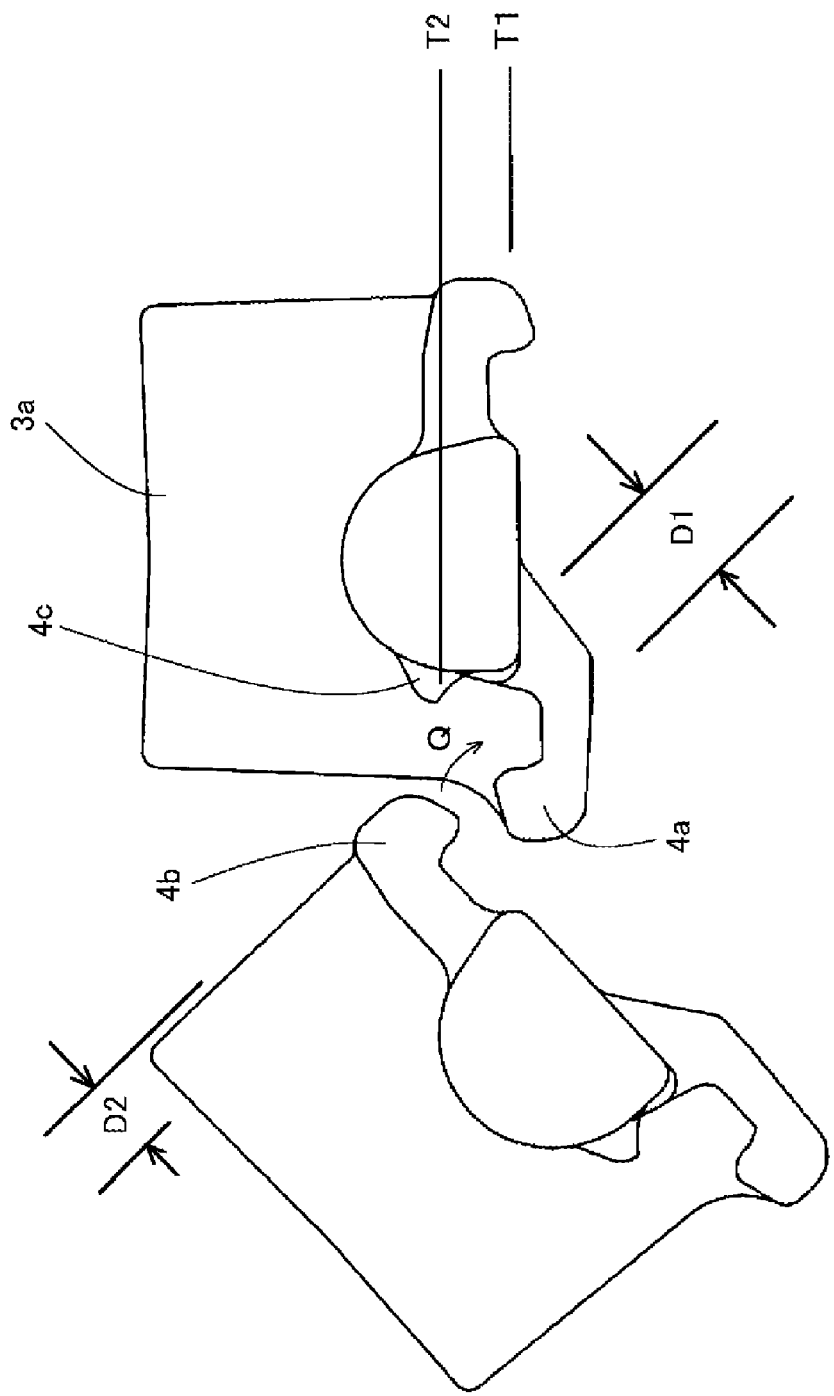
FIG. 18 is a view of the side of the core in FIG. 16.

As shown in FIG. 18, the height position in the thickness direction of the core, from which the projecting section 4c protrudes, is a height position T2 that is different from a height position T1 of the first tensile force carrying section 4a. The distance D1 between the tip of the projecting section 4c and the tip of the first tensile force carrying section 4a is wider than the width D2 of the tip of the second tensile force carrying section 4b. Accordingly, when combining the cores, the tip of the second tensile force carrying section 4b is inserted between the tip of the projecting section 4c and the first tensile force carrying section 4a while being rotated, as is shown by an arrow Q.

Figure 19:
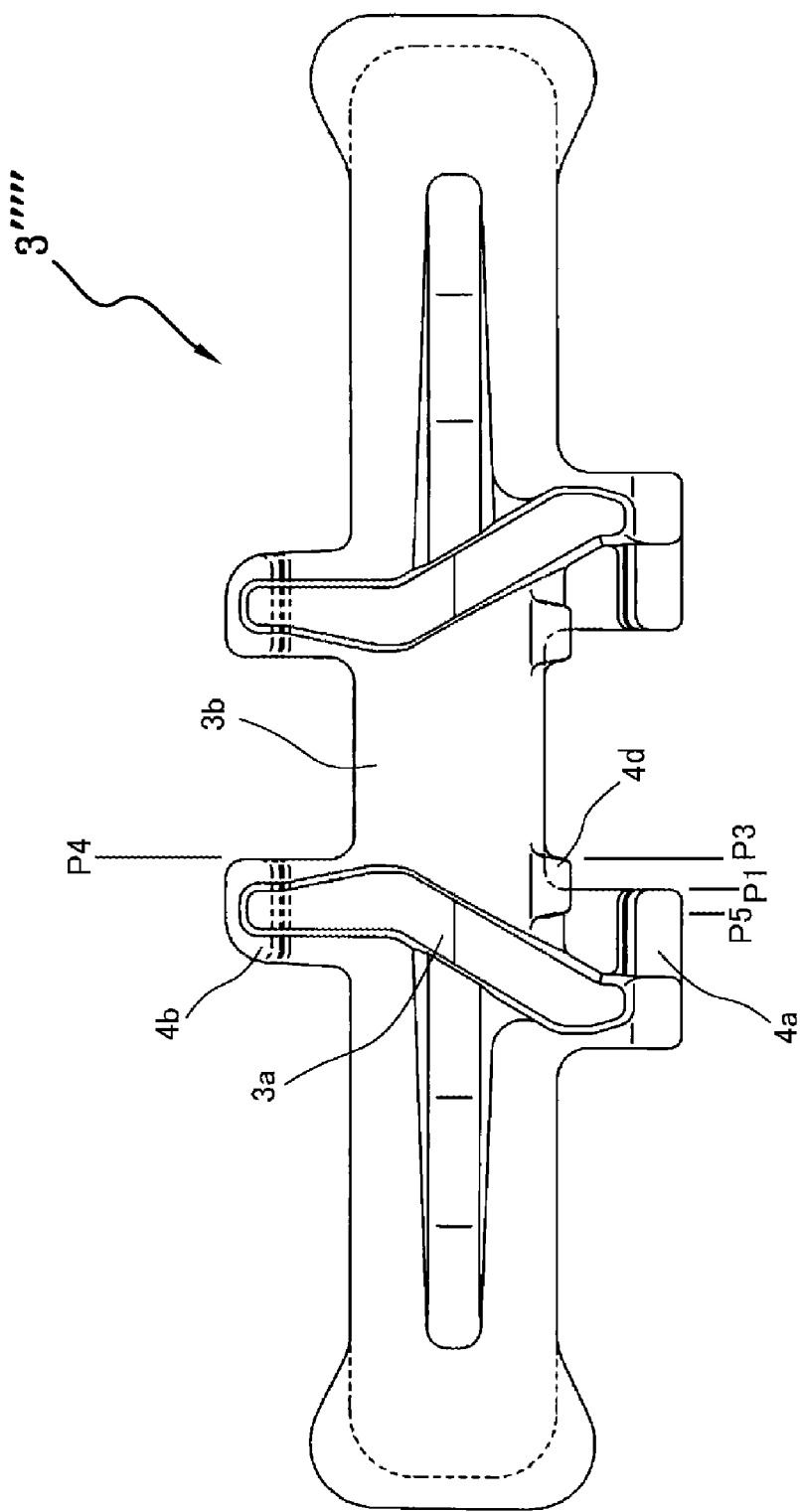
FIG. 19 is an explanatory view showing the state when a core of another example is used.

FIG. 19 is a view of another embodiment of the core 3''''' having the projecting section 4d. The projecting section 4d extends to a laterally outside position P5 that is laterally outside the inside position P1 of the first tensile force carrying section 4a, the projecting section 4d being provided at a position that also overlaps the first tensile force carrying section in the plan view.

Figure 20:
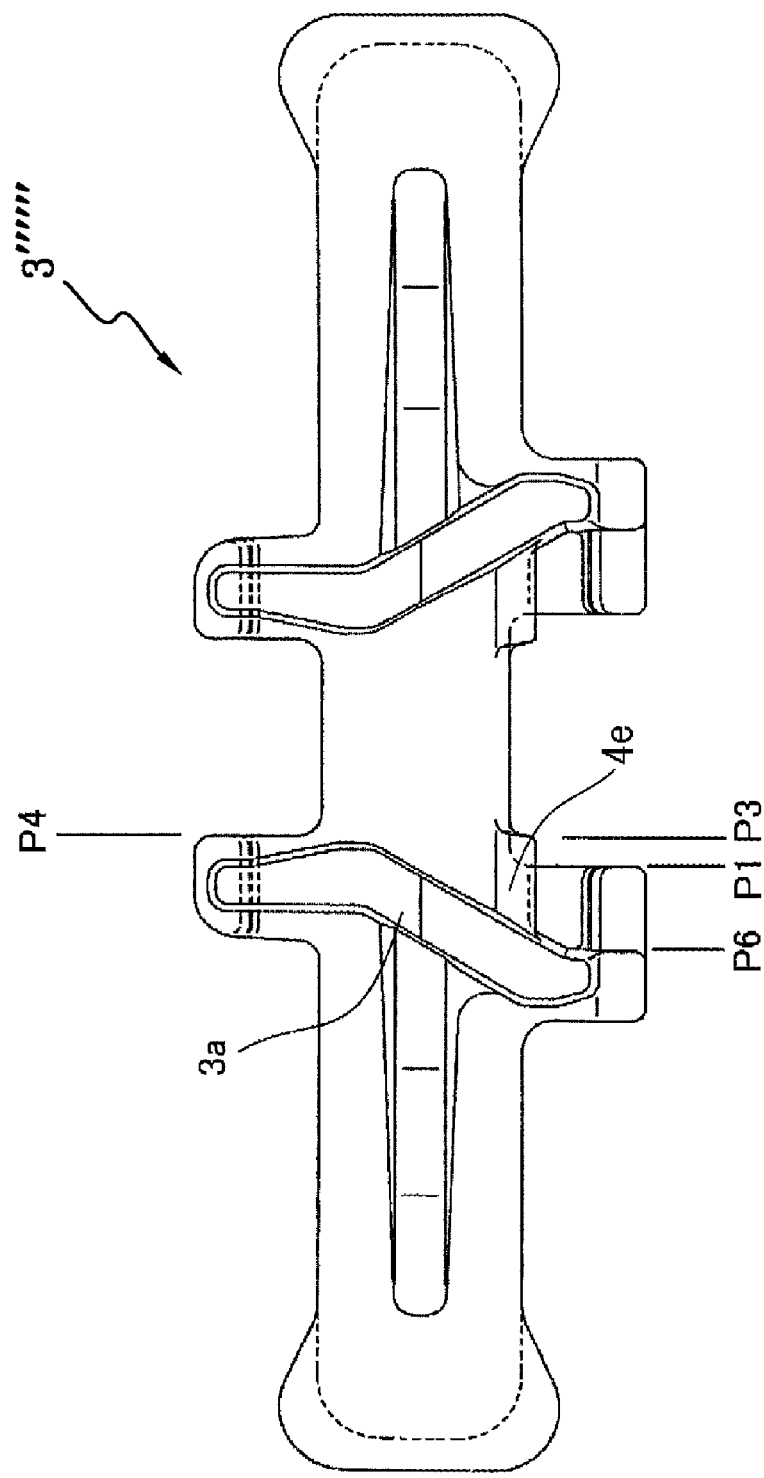
FIG. 20 is an explanatory view showing the state when a core of yet another example is used.

FIG. 20 is a view of another embodiment of the core 3'''''' having the projecting section 4e. The projecting section 4e extends to a further laterally outside position P6, being combined with the guide projection 3a. According to this structure, the mold is complicated, but the rigidity is improved because the projecting section 4e is combined with the guide projection 3a.

Figure 21A:
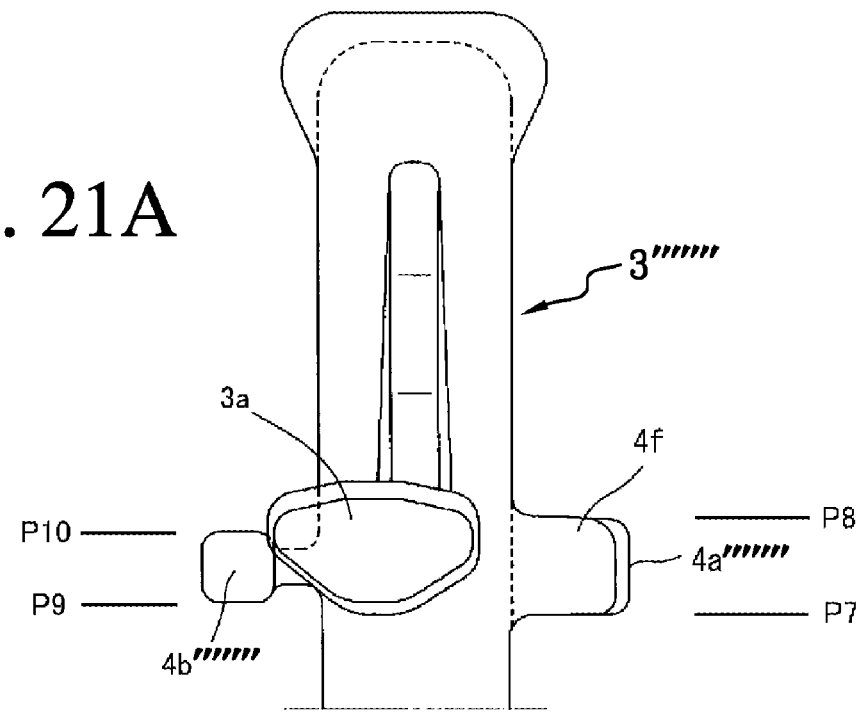
FIGS. 21A and 21B are explanatory views of a core having another structure.
Figure 21B:
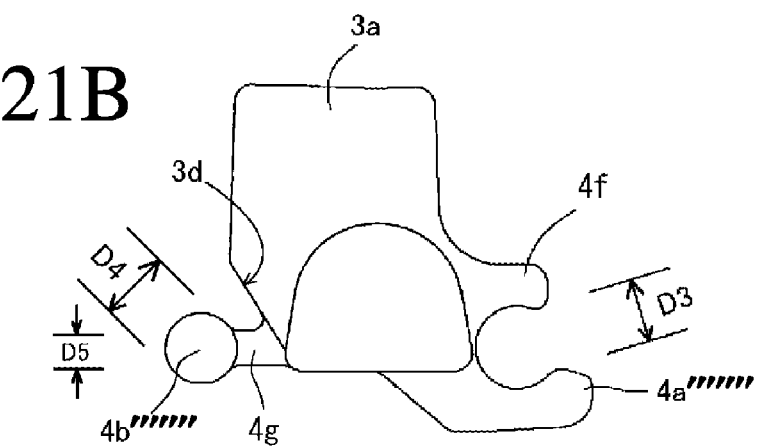

In FIG. 21, the projecting section 4f protrudes from the core 3''''''. The width D3 of an opening between the tip of the projecting section 4f and the first tensile force carrying section 4a'''''' is narrower than the width D4 of the second tensile force carrying section 4b'''''', and the second tensile force carrying section 4b'''''' is received in a space formed by the first tensile force carrying section 4a'''''' and the projecting section 4f. The second tensile force carrying section 4b'''''' protrudes from a place 3d, which cuts off the lower part of the guide projection 3a, the second tensile force carrying section 4b'''''' being joined to the core by a joining section 4g of the core. In the plan view (FIG. 21A), the projecting section 4f and the first force carrying section 4a'''''' overlap each other at right and left end positions P7, P8, and overlap also right and left end positions P9, P10 of the projecting section 4c. In FIG. 21, when the second tensile force carrying section 4b'''''' is received in the space formed by the first tensile force carrying section 4a'''''' and the projecting section 4f, the joining section 4g is not inserted from an opening having the width D3, but inserted from the side surface of the space. The joining section 4g (the width D5) is smaller than the width D3 of the opening, and therefore, the adjoining cores 3'''''' can move parallel to the curvature direction of the rubber track.

Figure 22:
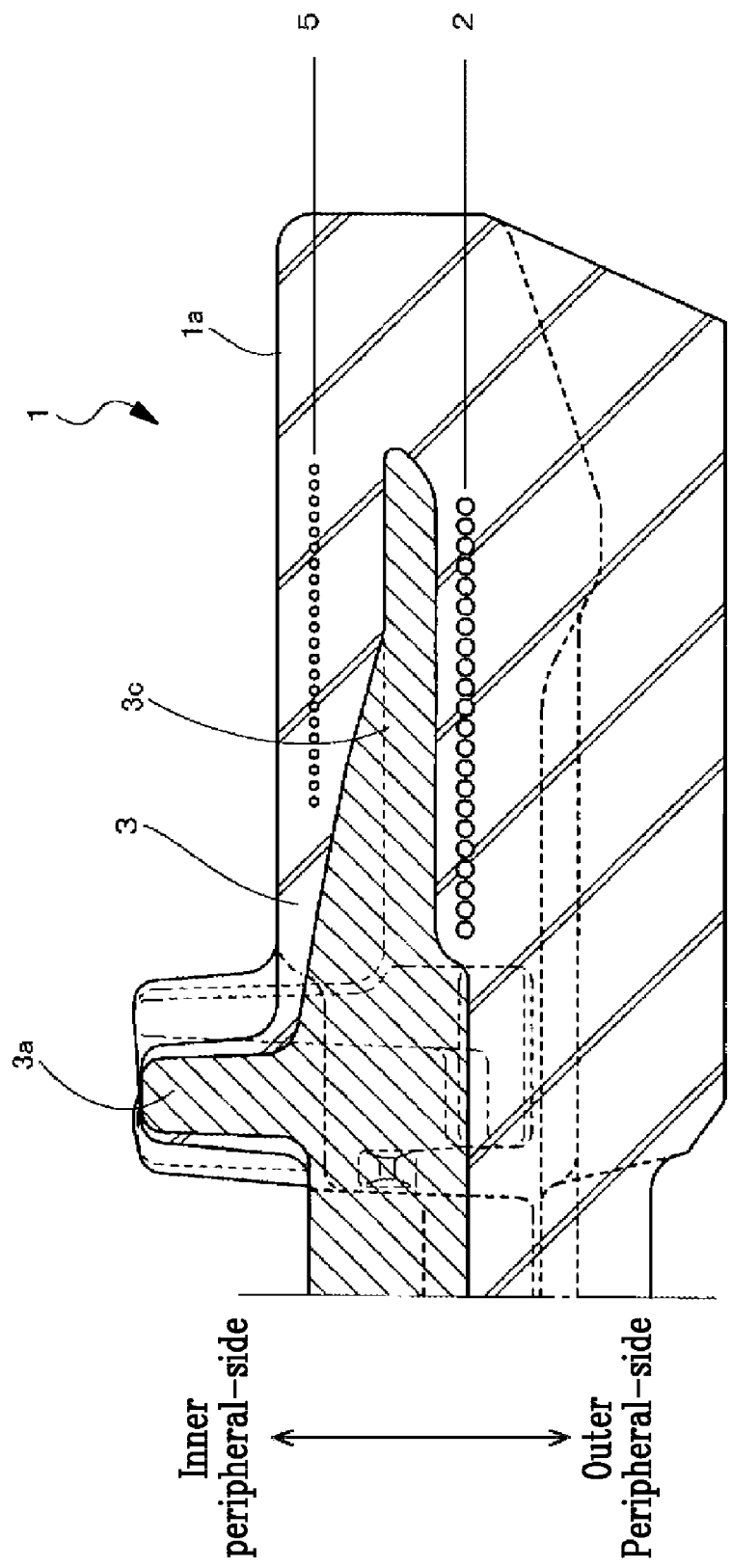
FIG. 22 is a sectional view in the lateral direction of a rubber track having a controlling belt layer.
Figure 23:
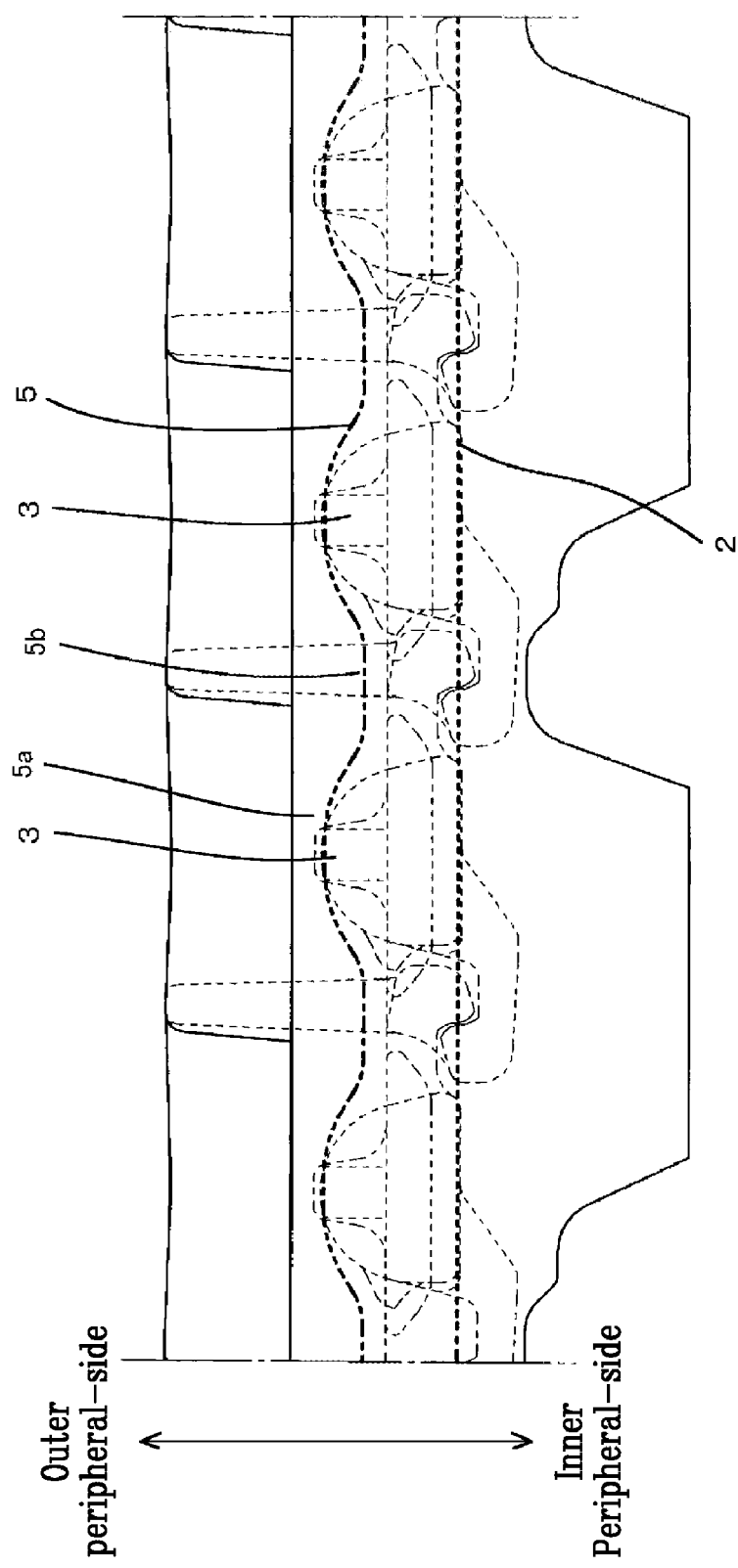
FIG. 23 is a side view in the circumferential direction of the rubber track in FIG. 22.

FIG. 22 and FIG. 23 show a sectional view in the lateral direction of the rubber track having a regulating belt layer and a side view in the circumferential direction of the rubber track, respectively. The rubber track has a regulating belt layer 5 closer to the inner peripheral-side of the rubber track than is the fixation belt layer 2. The figures respectively show a section in the lateral direction of the rubber track and a section in the circumferential direction thereof. The belt layer 5 is longer than the entire length in the circumferential direction of the rubber track, in which the belt layer 5 is located. In the normal situation, the belt layer 5 meanders parallel to an arrangement of the cores 3, being located on the inner peripheral-side at a position 5a of the core 3 and on the outer peripheral-side at a position 5b where the cores 3 are combined, respectively. Accordingly, in the normal situation, it is the fixation belt layer 2 that mainly keeps the rubber track from being loose. The regulating belt layer 5 is made of the same material as the fixation belt layer 2, and basically, does not expand and contract in comparison with the rubber material of the track.

In this case, the core may have the projecting sections 4c-4f, or may have no projecting sections.

Figure 24:
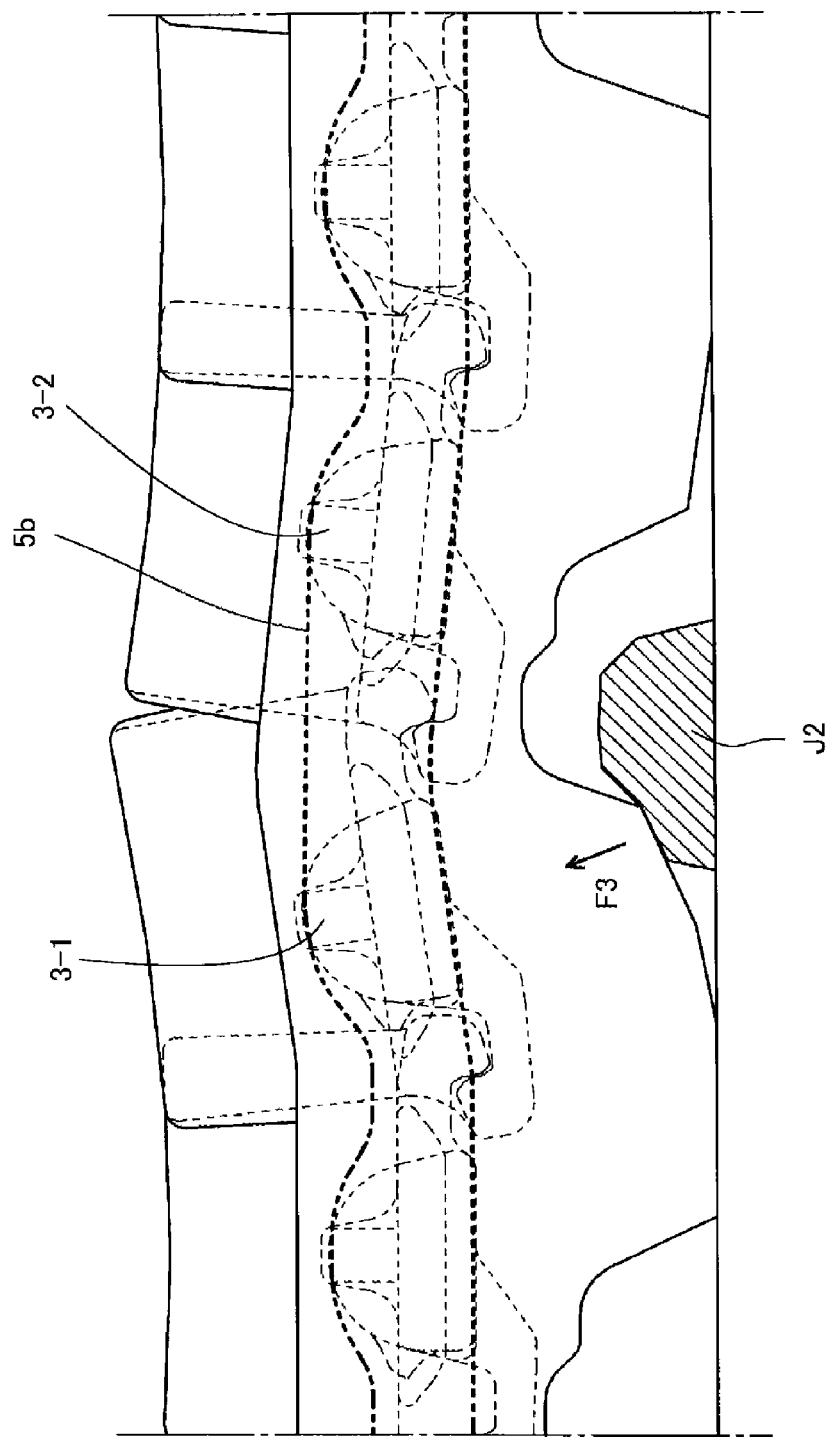
FIG. 24 is an explanatory view of an action of a rubber track having a controlling belt layer.

FIG. 24 is an explanatory view of motion of the rubber track having the regulating belt layer 5. When the pressing force F3 is partially imposed between the core 3-1 and the core 3-2 as the track moves over sand and stone J2, the regulating belt layer 5 between the core 3-1 and the core 3-2 becomes strained, thereby preventing the first tensile force carrying section 4a and the second tensile force carrying section 4b from separating. If the looseness of the regulating belt layer 5 is set within the range that the adjoining cores do not get out of joint, the adjoining cores do not get out of joint because the regulating belt layer does not expand and contract in itself.

The invention claimed is:

1. A core for a rubber track which is embedded in a rubber track body in a line comprising:
    a pair of wing sections;
    an engagement section adapted to be engaged with a sprocket, the engagement section connecting said wing sections; and
    a pair of guide projections protruding from an upper surface of the wing sections, the guide projections guiding the core so that the rubber track does not come off of a travelling device,
    said guide projections having guide projective extending sections, said guide projective extending sections protruding from a lower surface of the wing sections and having first portions protruding forward of the wing sections and the engagement section and second portions protruding rearward of the wing sections and the engagement section,
    the distance between inner surfaces of the second portions being larger than the distance between outer surfaces of the first portions,
    the core further comprising tensile force carrying sections protruding from both the inner surfaces of the second portions and the engagement sections, and
    said first portions having tensile force carrying sections adapted to engage the second portions in a male-female engagement.

2. A rubber track having a rubber track body formed in an endless belt and a plurality of cores arranged in the rubber track body in a line, wherein each core comprises:
    a pair of wing sections;
    an engagement section adapted to be engaged with a sprocket, the engagement section connecting said wing sections; and
    a pair of guide projections protruding from an upper surface of the wing sections, the guide projections guiding the core so that the rubber track does not come off of a travelling device,
    said guide projections having guide projective extending sections, said guide projective extending sections protruding from a lower surface of the wing sections and having first portions protruding forward of the wing sections and the engagement section and second portions protruding rearward of the wing sections and the engagement section,
    the distance between inner surfaces of the second portions being larger than the distance between outer surfaces of the first portions,
    the core further comprising tensile force carrying sections protruding from both the inner surfaces of the second portions and the engagement sections, and
    said first portions having tensile force carrying sections adapted to engage the second portions in a male-female engagement.

3. A rubber track according to claim 2, wherein said cores are arranged in a row in a circumferential direction of the rubber track with a fixed interval between the cores.

4. A rubber track having cores for a rubber track according to claim 3, further comprising a fixation belt extending across, in a thickness direction of the cores, adjacent cores engaged in a male-female engagement.

5. A rubber track claimed in claim 4, wherein the fixation belt extends over the full circumference of the rubber track in an endless shape.

6. A rubber track according to claim 5, wherein the rubber track is adapted to be wound around coupled driving wheels and driving wheels of an endless track travelling device,
    wherein the engagement section is located in a center region of the core in a longitudinal direction of the core;
    wherein said guide projections are at opposite ends of the engagement section to prevent the rubber track from coming off the coupled driving wheels and driving wheels of an endless track travelling device;

wherein the wing sections are provided on outer sides of the guide projections;

wherein the tensile force carrying sections carry tensile forces acting in a lateral direction of the core and pressing forces acting in a thickness direction of the core, the tensile force carrying sections being located at positions in a thickness direction of the core that are closer to an outer peripheral side of the rubber track than are outer peripheral-side surfaces of the wing sections;

wherein the fixation belt is parallel to the circumferential direction of the rubber track and at a position related to the tensile force carrying sections; and wherein the tensile force carrying sections, of cores adjoining one another in a circumferential direction of the rubber track, that face one another engage one another, and each of said cores has a projecting section at a height, in the thickness direction of the core, that is different from the height of the tensile force carrying section of the same core, so as to sandwich the tensile force carrying section of an adjacent core in tensile force carrying engagement.

* * * * *